(12) United States Patent
Otsubo

(10) Patent No.: US 8,702,252 B2
(45) Date of Patent: Apr. 22, 2014

(54) OPTICAL IMAGING APPARATUS AND OPTICAL IMAGING METHOD USING THE SAME

(75) Inventor: Makoto Otsubo, Hiroshima (JP)

(73) Assignee: Asukanet Company, Ltd., Hiroshima-shi (JP)

(*) Notice: Subject to any disclaimer, the term of this patent is extended or adjusted under 35 U.S.C. 154(b) by 258 days.

(21) Appl. No.: 13/361,597

(22) Filed: Jan. 30, 2012

(65) Prior Publication Data

US 2013/0194648 A1 Aug. 1, 2013

(51) Int. Cl.
G02B 5/08 (2006.01)
G02B 5/00 (2006.01)

(52) U.S. Cl.
CPC .................... *G02B 5/008* (2013.01)
USPC ............ 359/857; 359/856; 359/475; 359/726

(58) Field of Classification Search
USPC ......... 359/850, 855–858, 866, 729–731, 466, 359/471, 475, 477
See application file for complete search history.

(56) References Cited

U.S. PATENT DOCUMENTS

| 4,741,595 A | 5/1988 | Onoda et al. |
|---|---|---|
| 2009/0310231 A1 | 12/2009 | Maekawa |
| 2010/0002319 A1 | 1/2010 | Maekawa |
| 2010/0195055 A1 | 8/2010 | Maekawa |
| 2010/0231860 A1 | 9/2010 | Maekawa |

FOREIGN PATENT DOCUMENTS

| EP | 2180365 | * | 4/2010 |
|---|---|---|---|
| JP | 58-21702 A | | 2/1983 |
| JP | 61-25104 A | | 2/1986 |
| JP | 63-191182 A | | 8/1988 |
| JP | 06-160770 A | | 6/1994 |
| JP | 07-056112 A | | 3/1995 |
| JP | 09-005503 A | | 1/1997 |
| JP | 2008-158114 A | | 7/2008 |
| JP | 2011090117 | * | 5/2011 |
| WO | 2007/116639 A1 | | 10/2007 |
| WO | 2008/041616 A1 | | 4/2008 |
| WO | 2009/017134 A1 | | 2/2009 |
| WO | 2009/131128 A1 | | 10/2009 |

OTHER PUBLICATIONS

Japanese Notification of Reasons for Refusal mailed May 15, 2012, issued in corresponding Japanese Patent Application No. 2009-242789, w/ partial English translation.

(Continued)

*Primary Examiner* — James Phan
(74) *Attorney, Agent, or Firm* — Westerman, Hattori, Daniels & Adrian, LLP

(57) ABSTRACT

An optical imaging apparatus operable to form a sharp stereo image in the air beside an observer, includes a flat plate-shaped light-controlling panel having numerous light-reflecting elements disposed side by side, each of which allowing light from the object to pass therethrough by reflecting the light by a first reflective surface and a second reflective surface disposed in a crossed arrangement with respect to the first reflective surface, wherein the light-controlling panel has a plurality of segment light-controlling panels in which the first reflective surfaces and the second reflective surfaces included are parallel, respectively, centerlines P of the respective segment light-controlling panels, when viewed from thereabove, intersect at a point O on the light-controlling panel, and bisectors which bisect crossing angles between the first and the second reflective surfaces of the light-reflecting elements existing on the centerlines P coincide with the centerlines P when viewed from thereabove.

17 Claims, 15 Drawing Sheets

(56) References Cited

OTHER PUBLICATIONS

Satoshi Maekawa et al., "Advances in Passive Imaging Elements with Micromirror Array," National Institute of Information and Communications Technology, 3-5 Hikaridai, Seika-cho, Soraku-gun, Kyoto, Japan; Kobe University, 1-1 Rokkodai-cho, Nada-ku, Kobe, Japan, SPIE-IS&T vol. 6803 68030B-1 © 2008 SPIE-IS&T.

* cited by examiner

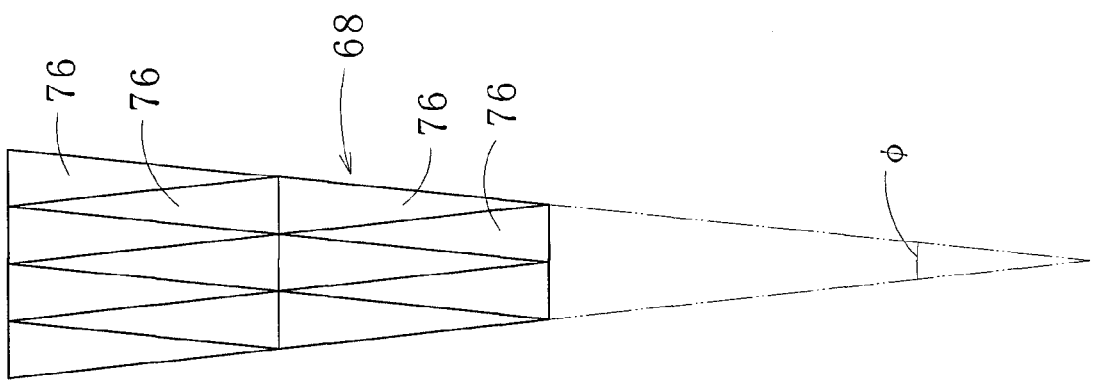
FIG. 15(A)  FIG. 15(B)  FIG. 15(C)
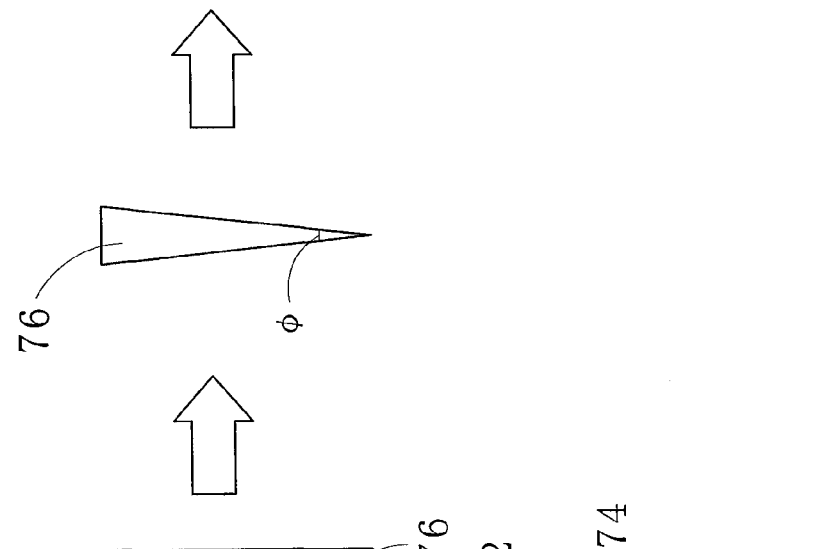
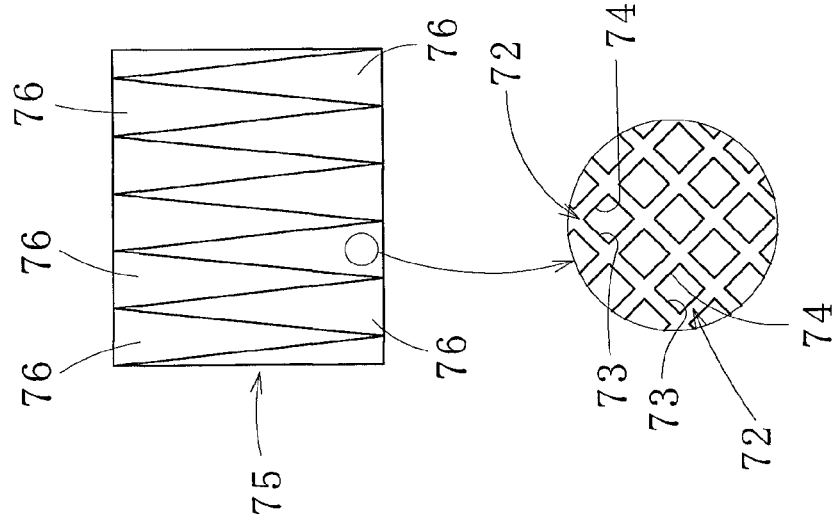

US 8,702,252 B2

OPTICAL IMAGING APPARATUS AND OPTICAL IMAGING METHOD USING THE SAME

TECHNICAL FIELD

The present invention relates to an optical imaging apparatus for forming a real image in the air and to an optical imaging method using the same.

BACKGROUND ART

For forming a real image using light emitted from the surface of an object, such have been proposed as an image forming element constituted by disposing a plurality of double-sided reflection bands in a width of several n and several tens μ parallel to one other at a micropitch such that adjacent reflection surfaces face each other, wherein a convergence region of reflection light reflected by the reflection surface is reduced (e.g., see Japanese published unexamined application S58-21702), and a compound lens constituted by disposing (e.g., radially and concentrically) a plurality of light transmission channels (rod lenses), each having equal incident and reflection angles, parallel to an optical axis so that light falling incident on, passing through, and being emitted from the respective light transmission channels is converged (e.g., see Japanese published unexamined application S61-25104). Also, an optical imaging apparatus has been proposed (e.g., see Japanese published unexamined application H09-5503), comprising a panel provided with a number of reflection elements having reflection surfaces orthogonal to the panel surface, wherein light from an object is reflected once at the respective reflection surfaces and the reflected light obtained is converged to form a real image.

Moreover, as an optical element for causing a light ray to bend as light being transmitted an element surface composing one planar surface, it has been disclosed to compose an imaging element by disposing a plurality of unit optical elements for reflecting light by at least one mirror surface arranged at an angle perpendicular, or nearly perpendicular, to the element surface, wherein light emitted from an object disposed on one side of the element surface is reflected by the mirror surface as the light being transmitted through the element surface to form a real image in a space that contains no physical entity on the other side of the element surface, and also disclosed is a display device employing such an imaging element. (e.g., see WO2007/116639).

Furthermore, WO 2009/131128 discloses an optical imaging device which enables a stereoimage on one side to be displayed on the other side, using first and second light control panels formed by aligning a number of band-shaped flat light reflectors at a constant pitch in an interior of a transparent flat plate, wherein the first and the second light-controlling panels are disposed facing each other such that the flat light reflectors thereof are orthogonal to one another.

SUMMARY OF THE INVENTION

Task to be Solved by the Invention

However, the image forming element described in Japanese published unexamined application S58-21702 has a drawback that the light emitted from the object and passing through the image forming element is not always converged to one point, and thus a sharp real image cannot be obtained. Another drawback is that, when the real image is observed, depending on the observing position, mirror images (virtual images) formed by reflected light reflected at the reflection surfaces of the image forming element is observed in addition to the real image, bothering the observation of the real image.

The compound lens described in Japanese published unexamined application S61-25104 has a drawback that when used to reproduce an image, a sharp real image is unable to be obtained due to such as aberration and diffraction of the lenses, although there is no problem to be used in fields of optical communication and the like.

Also, the optical imaging apparatus described in Japanese published unexamined application 1997-5503 has a drawback that even though the light from the object is reflected at the reflection surfaces, the light is not always converged to one point, and thus a sharp real image cannot be obtained. Another drawback is that, when the real image is observed, depending on the observing position, a mirror image formed by the reflection reflected at the reflection surfaces of the image forming element is observed in addition to the real image, bothering the observation of the real image. Moreover, the imaging element described in WO2007/116639 has a drawback that manufacturing thereof is extremely complicated, resulting in high production costs, because the imaging element is formed, e.g., by first forming tubular bodies in an array on a metal die by nanoengineering, then forming flat mirror surfaces with a surface roughness of 50 nm or less on side faces corresponding to first and second interior wall surfaces orthogonal to each other.

The technique described in WO2009/131128 has a drawback that there is a case where the light is reflected once each at the first and the second light control panels while passing through the optical imaging device, thus the stereoimage formed on the other side of the optical imaging device contains ghost or noise.

The present invention has been made in view of the above, and the objects thereof are to provide an optical imaging apparatus which can be relatively easily manufactured and is operable to easily form a sharp real image in the air on a side of an observer observing an object, and to provide an optical imaging method using such an apparatus.

Means for Solving the Task

An optical imaging apparatus according to a first invention for attaining the above object comprising a flat plate-shaped light-controlling panel for forming a real image of an object at a plane-symmetric position to the object with respect to the light-controlling panel as a central plane, the light-controlling panel having numerous light-reflecting elements disposed side by side, each of the light-reflecting elements allowing light from the object to pass therethrough by reflecting the light at a first reflective surface and further reflecting the light at a second reflective surface, the second reflective surface being disposed on a level different from that of the first reflective surface while being paired with the first reflective surface, and being in a crossed arrangement with respect to the first reflective surface when viewed from thereabove, wherein the light-controlling panel is divided to comprise a plurality of segment light-controlling panels in which the first reflective surfaces and the second reflective surfaces included are parallel, respectively, and wherein centerlines of the respective segment light-controlling panels when viewed from thereabove intersect at one point on the light-controlling panel, and further wherein bisectors which bisect crossing angles between the first reflective surfaces and the second reflective surfaces of the light-reflecting elements existing on the centerlines coincide with the centerlines when viewed from thereabove.

In the optical imaging apparatus according to the first invention for attaining the above object, it is preferable that the first and the second reflective surfaces comprised in the segment light-controlling panels are formed numerously inside a first and a second segment transparent plates, respectively, the first and the second reflective surfaces being in strip shapes and arranged side by side at a constant pitch perpendicularly to one sides of the first and the second segment transparent plates, respectively, and wherein the numerous light-reflecting elements are formed by disposing one sides of the first and the second segment transparent plates face-to-face in a manner that the first and the second reflective surfaces are crossed.

An optical imaging apparatus according to a second invention for attaining the above object comprising a flat plate-shaped light-controlling panel for forming a real image of an object at a position plane-symmetric to the object with respect to the light-controlling panel, the light-controlling panel having a number of light-reflecting elements disposed side by side, each of the light-reflecting elements allowing light from the object to pass therethrough by reflecting the light at a first reflective surface and further reflecting the light at a second reflective surface disposed in a crossed arrangement with respect to the first reflective surface, wherein the light-controlling panel is divided to comprise a plurality of segment light-controlling panels in which the first reflective surfaces and the second reflective surfaces included are parallel, respectively, and wherein centerlines of the respective segment light-controlling panels when viewed from thereabove intersect at one point on the light-controlling panel, and further wherein bisectors which bisect crossing angles between the first reflective surfaces and the second reflective surfaces of the light-reflecting elements existing on the centerlines when viewed from thereabove coincide with the centerlines.

In the optical imaging apparatuses according to the first and the second inventions for attaining the above object, it is preferable that a flat plate-shaped light-shielding portion where the light-reflecting element is absent is provided centering around the one point where the centerlines of the respective segment light-controlling panels intersect, and the object is placed in a cylindrical space having a central axis which is a perpendicular line passing through the one point and being perpendicular to the light-shielding portion, and also having a cross-sectional shape same as that of the light-shielding portion. Furthermore, in the optical imaging devices according to the above inventions, it is preferable that the respective segment light-controlling panels have a shape of an isosceles trapezoid when viewed from thereabove.

An optical imaging method according to a third invention for attaining the above object is a method using a light-controlling panel for forming a real image of an object at a position plane-symmetric to the object with respect to the light-controlling panel, the light-controlling panel having a number of light-reflecting elements disposed side by side, each of the light-reflecting elements allowing light from the object to pass therethrough by reflecting the light at a first reflective surface and further reflecting the light at a second reflective surface, the second reflective surface being disposed on a level different from that of the first reflective surface while being paired with the first reflective surface, and being in a crossed arrangement with respect to the first reflective surface when viewed from thereabove, comprising: dividing the light-controlling panel into a plurality of segment light-controlling panels wherein the first and the second reflective surfaces included are parallel, respectively; bringing centerlines of the respective segment light-controlling panels to intersect at one point on the light-controlling panel when viewed from thereabove; and bringing bisectors which bisect crossing angles between the first reflective surfaces and the second reflective surfaces of the light-reflecting elements existing on the centerlines, when viewed from thereabove, to coincide with the centerlines, thereby decreasing a ratio of the light-reflecting elements allowing light to pass therethrough by reflecting the light once by either one of the first and the second reflective surfaces with respect to the light-reflecting elements allowing light to pass therethrough by reflecting the light once each by the first and the second reflective surfaces in the respective segment light-controlling panels.

An optical imaging method according to a fourth invention for attaining the above object is a method using a flat plate-shaped light-controlling panel for forming a real image of an object at a position plane-symmetric to the object with respect to the light-controlling panel, the light-controlling panel having a number of light-reflecting elements disposed side by side, each of the light-reflecting elements allowing light from the object to pass therethrough by reflecting the light at a first reflective surface and further reflecting the light at a second reflective surface disposed in a crossed arrangement with respect to the first reflective surface, comprising: dividing the light-controlling panel into a plurality of segment light-controlling panels wherein the first reflective surfaces and the second reflective surfaces included are parallel, respectively; bringing centerlines of the respective segment light-controlling panels to intersect at one point on the light-controlling panel; and bringing bisectors which bisect crossing angles between the first reflective surfaces and the second reflective surfaces of the light-reflecting elements existing on the centerlines, when viewed from thereabove, to coincide with the centerlines, thereby decreasing a ratio of the light-reflecting elements allowing light to pass therethrough by reflecting the light once by either one of the first and the second reflective surfaces with respect to the light-reflecting elements allowing light to pass therethrough by reflecting the light once each by the first and the second reflective surfaces in the respective segment light-controlling panels.

In the optical imaging methods according to the third and the fourth inventions for attaining the above object, it is preferable to form a flat plate-shaped light-shielding portion where the light-reflecting element is absent centering around the one point where the centerlines of the respective segment light-controlling panels intersect and to place the object in a cylindrical space and at one side of the light-shielding portion, the cylindrical space having a central axis which is a perpendicular line passing through the one point and being perpendicular to the light-shielding portion, and whose cross-section is the light-shielding portion. Moreover, in the optical imaging method according to the above inventions, it is preferable to form the respective segment light-controlling panels to have a shape of an isosceles trapezoid when viewed from thereabove.

Effect of the Invention

In the optical imaging apparatuses according to the first and the second inventions, the light falling incident from the object onto the light-reflecting elements in the light-controlling panel is reflected by the first reflective surfaces and further reflected by the second reflective surfaces disposed in the crossed arrangement with respect to the first reflective surfaces, thereby passing through the light-reflecting elements. Thus, among the light emitted radially from a point of the object, light passed through different light-reflecting elements can be converged, allowing the real image to be formed. Furthermore, the light-controlling panel is divided to comprise a plurality of segment light-controlling panels in which the first reflective surfaces and the second reflective surfaces included are parallel, respectively; and the centerlines of the respective segment light-controlling panels when viewed from thereabove intersect at the one point on the light-controlling panel; and moreover, the bisectors which bisect the crossing angles between the first reflective surfaces and the second reflective surfaces of the light-reflecting elements existing on the centerlines coincide with the centerlines when viewed from thereabove. Such a configuration decreases a ratio of light passing through the light-reflecting elements after being reflected only once by either one of the first and the second reflective surfaces with respect to the light passing through the light-reflecting elements after being reflected once each by the first and the second reflective surfaces, which inhibits the appearance of mirror images of the object caused by transmitted light due to one-time reflection as ghost or noise and enables the light-controlling panel operable to form a sharp real image to be easily realized. More specifically, real images of the object formed by the respective segment light-controlling panels are formed at a same position, thus a brighter real image can be obtained.

In the optical imaging apparatus according to the first invention, the numerous light-reflecting elements can be simply manufactured at low costs in a case where the first and the second reflective surfaces comprised in the segment light-controlling panels are formed numerously inside a first and a second segment transparent plates, respectively, the first and the second reflective surfaces being in strip shapes and arranged side by side at a constant pitch perpendicularly to one sides of the first and the second segment transparent plates, respectively, and the numerous light-reflecting elements are formed by disposing one sides of the first and the second segment transparent plates face-to-face in a manner that the first and the second reflective surfaces are crossed.

In the optical imaging apparatuses according to the first and the second inventions, among the light from the object, transmitted light without being reflected by the first or the second reflective surfaces (non-reflected light), as well as transmitted light due to one-time reflection can be intercepted in a case where a flat plate-shaped light-shielding portion, where the light-reflecting element is absent, is formed centering around the one point at which the centerlines of the respective segment light-controlling panels intersect, and the object is placed at one side of the light-shielding portion and in a cylindrical space having a central axis, which is a perpendicular line passing through the one point and being perpendicular to the light-shielding portion, and whose cross-section is the light-shielding portion.

In the optical imaging methods according to the third and the fourth inventions, the light falling incident from the object onto the light-reflecting elements in the light-controlling panel is reflected by the first reflective surfaces and further reflected by the second reflective surfaces disposed in the crossed arrangement with respect to the first reflective surfaces, thereby passing through the light-reflecting elements. Thus, among the light emitted radially from a point of the object, light passed through different light-reflecting elements can be converged, allowing the real image to be formed. Furthermore, the light-controlling panel is divided to comprise a plurality of segment light-controlling panels in which the first reflective surfaces and the second reflective surfaces included are parallel, respectively; and centerlines of the respective segment light-controlling panels, when viewed from thereabove, are brought to intersect at one point on the light-controlling panel; and moreover, bisectors which bisect crossing angles between the first reflective surfaces and the second reflective surfaces of the light-reflecting elements existing on the centerlines are brought to coincide with the centerlines when viewed from thereabove. As a result, in the respective segment light-controlling panels, the ratio of the light-reflecting elements allowing light to pass therethrough by reflecting the light once at either one of the first and the second reflective surfaces with respect to the light-reflecting elements allowing light to pass therethrough by reflecting the light once each by the first and the second reflective surfaces is reduced, which inhibits the appearance of mirror images of the object caused by transmitted light due to one-time reflection as ghost or noise and enables a sharp real image to be formed.

In the optical imaging methods according to the third and the fourth inventions, among the light from the object, light (non-reflected transmitted light) directly transmitted without being reflected by the first or the second reflective surfaces as well as transmitted light due to one-time reflection can also be intercepted efficiently in a case where a flat plate-shaped light-shielding portion, where the light-reflecting element is absent, is provided centering around the one point where the centerlines of the respective segment light-controlling panels intersect, and the object is placed at one side of the light-shielding portion and in a cylindrical space having a central axis, which is a perpendicular line passing through the one point and being perpendicular to the light-shielding portion, and whose cross-section is the light-shielding portion. Here, in the optical imaging methods and optical imaging apparatuses described above, the respective light-controlling panels may be formed in a shape of an isosceles trapezoid when viewed from thereabove, which enables easy designing and manufacturing.

BRIEF DESCRIPTION OF THE DRAWINGS

FIG. 15 (A)-(C) are explanatory diagrams illustrating a manufacturing method of a segment light-controlling panel.

BEST MODE FOR CARRYING OUT THE INVENTION

Preferred embodiments of the present invention will now be described hereunder with reference to the accompanying drawings for the present invention to be understood.

Figure 1A:
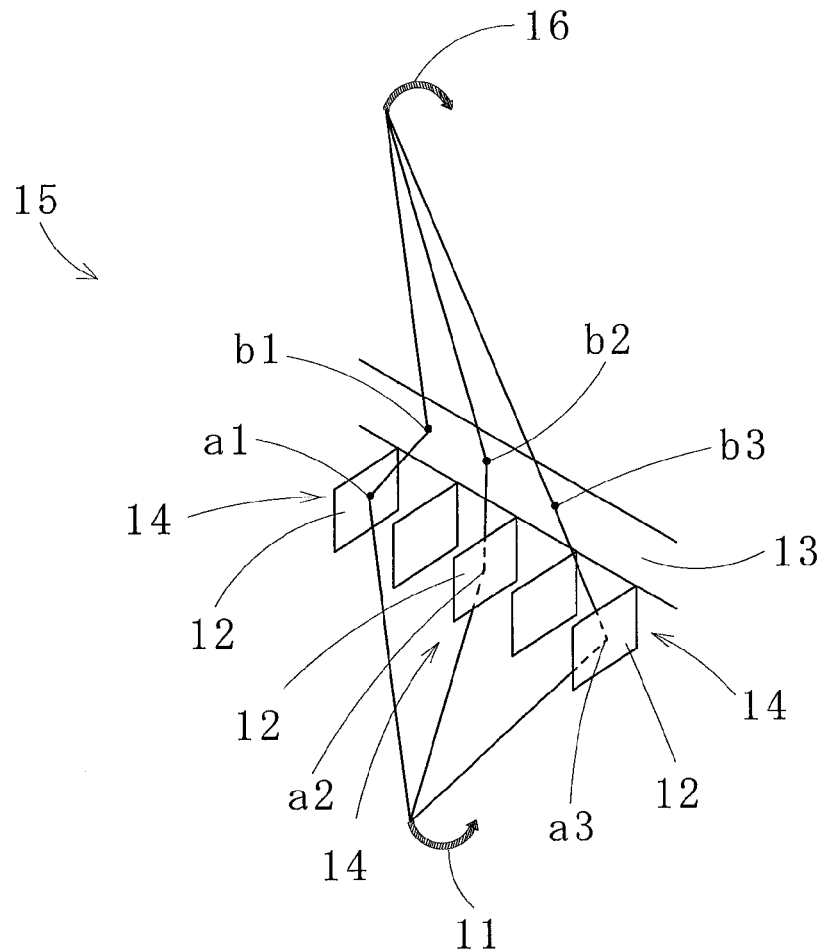
FIGS. 1 (A) and (B) are explanatory diagrams illustrating light-reflecting elements provided to a light-controlling panel of an optical imaging apparatus according to a first embodiment of the present invention.
Figure 1B:
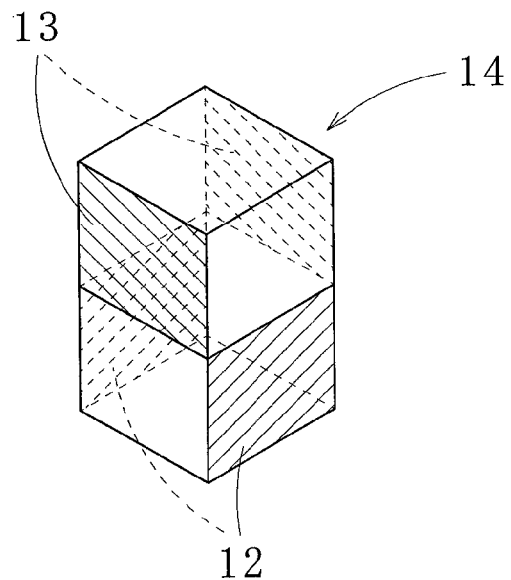

As illustrated in FIGS. 1(A), 1(B), and 2, an optical imaging apparatus 10 according to a first embodiment of the present invention comprises a flat plate-shaped light-controlling panel 15 for forming a real image 16 of an object 11 at a position plane-symmetric to the object 11 with respect to the light-controlling panel 15, the light-controlling panel 15 having numerous light-reflecting elements 14 (see FIG. 1(B)), each of the light-reflecting elements 14 allowing light from the object 11 to pass therethrough by reflecting the light at a first reflective surface 12 and further reflecting the light at a second reflective surface 13, the second reflective surface 13 being disposed on a level different from that of the first reflective surface 12 while being paired with the first reflective surface 12, and being in a crossed arrangement (e.g., orthogonal arrangement) with respect to the first reflective surface 12 when viewed from thereabove. Here, adjacent light-reflecting elements 14 formed side by side are disposed closely, and the first and the second reflective surfaces 12 and 13 composing the light-reflecting elements 14 are provided at a constant interval in the vertical direction, respectively. Thereby, the respective first and the second reflective surfaces 12 and 13 are close or in contact with each other to be integrated as one body in a crossed manner. In FIG. 1(A), for a clear illustration of the light-reflecting elements 14, only the second reflective surfaces 13 at one side corresponding to the light-reflecting elements 14 are illustrated. Hereunder, the present invention will be described more in detail.

Figure 2A:
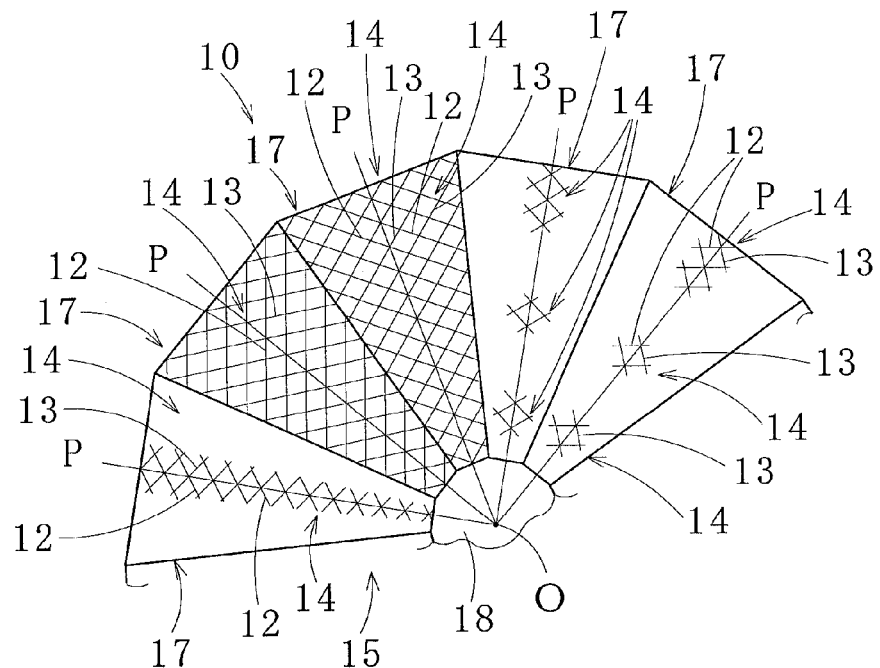
FIGS. 2 (A) and (B) are a plan view and a sectional side view illustrating the optical imaging apparatus, respectively.
Figure 2B:
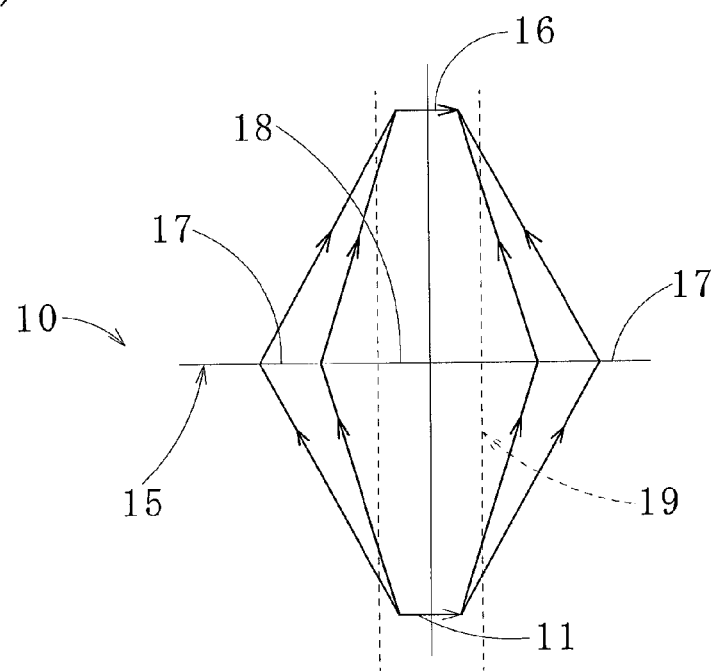

The light-controlling panel 15, as illustrated in FIGS. 2(A) and 2(B), is divided to comprise a plurality of, e.g., N pieces of segment light-controlling panels 17 having a trapezoidal shape of a same size, in which the first reflective surfaces 12 and the second reflective surfaces 13 included are parallel, respectively. When the respective segment light-controlling panels 17 are plan-viewed, centerlines P thereof intersect at a point O on the light-controlling panel 15, and moreover, bisectors which bisect the crossing angles between the first reflective surfaces 12 and the second reflective surfaces 13 of the light-reflecting elements 14 existing on the centerlines P coincide with the centerlines P when viewed from thereabove. In a case where the segment light-controlling panels 17 have a trapezoidal shape (an isosceles trapezoidal shape) of the same size, the light-controlling panel 15 formed by arranging the segment light-controlling panels 17 in a manner that the centerlines P thereof intersect at the point O forms a shape of a regular polygon with N sides when viewed from thereabove.

Moreover, centering around the point O at which the centerlines P of the respective segment light-controlling panels 17 intersect, a flat plate-shaped light-shielding portion 18, where the light-reflecting element 14 is absent, is formed. The object 11 is placed at one side of the light-shielding portion 18 (below the light-shielding portion 18 in FIG. 2(B)), and in a cylindrical space 19 whose cross-section is the light-shielding portion 18 and having a central axis which is a perpendicular line passing through the point O and being perpendicular to the light-shielding portion 18. When the segment light-controlling panels 17 are in a trapezoidal shape, the light-shielding portion 18 when viewed from thereabove forms e.g. a shape of a regular polygon (a regular polygon with N sides), which circumscribes a circumcircle of the object 11 when viewed from thereabove. Among the light from the object 11, the light-shielding portion 18 allows light rays passing through the light-reflecting elements 14 without being reflected by the first and the second reflective surfaces 12 and 13 (non-reflected light rays) to be intercepted. Moreover, among the light from the object 11, the light-shielding portion 18 also allows light rays falling incident on the light-controlling panel 15 at small incident angles and passing through the light-reflecting elements 14 by being reflected only once by either one of the first and the second reflective surfaces 12 and 13 to be effectively intercepted. Such a configuration prevents mirror images (virtual images) of the object 11 caused by one-time reflection at either one of the first and the second reflective surfaces 12 and 13 from appearing as ghost or noise disturbing the real image 16.

Here, the "N" is an integral number, e.g., in a range of 4 to 100. The larger the N is, the more improved a ratio of the light-reflecting elements 14 existing on the centerlines P with respect to the light-reflecting elements 14 comprised in the light-controlling panel 15. Improved ratio of the light-reflecting elements 14 existing on the centerlines P contributes to relatively increase a ratio of the light passing through the light-reflecting elements 14 by being reflected only once each by the first and the second reflective surfaces 12 and 13 (i.e., relatively decrease a ratio of the light passing through the light-reflecting elements 14 by being reflected only once at either one of the first and the second reflective surfaces 12 and 13), thereby allowing the real image 16 to be brighter while preventing the appearance of the mirror images of the object 11. Moreover, a light-controlling panel in a rectangular shape when viewed from thereabove may be cut out from a part of a light-controlling panel in a shape of a regular polygon when viewed from thereabove.

Figure 3A:
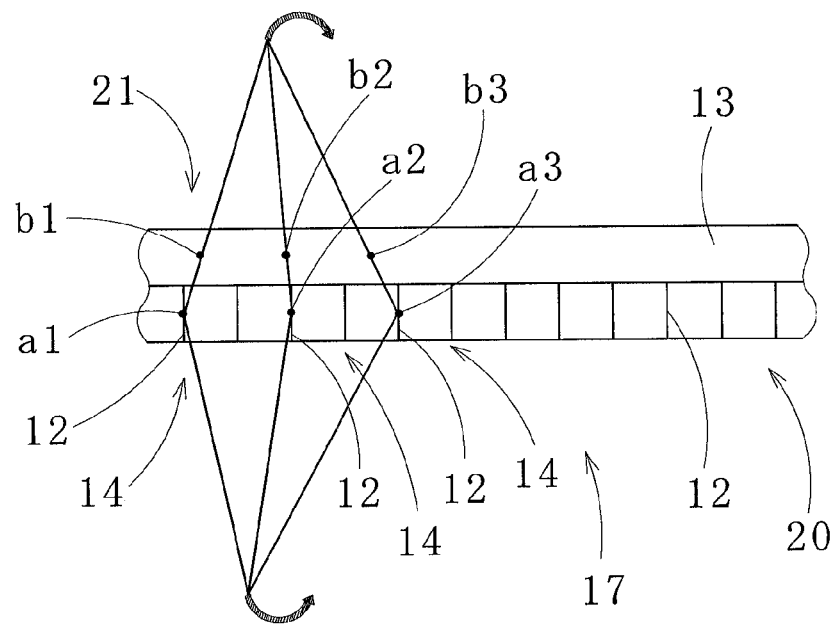
FIGS. 3 (A) and (B) are a cross-sectional view and a plan view illustrating a segment light-controlling panel, respectively.
Figure 3B:
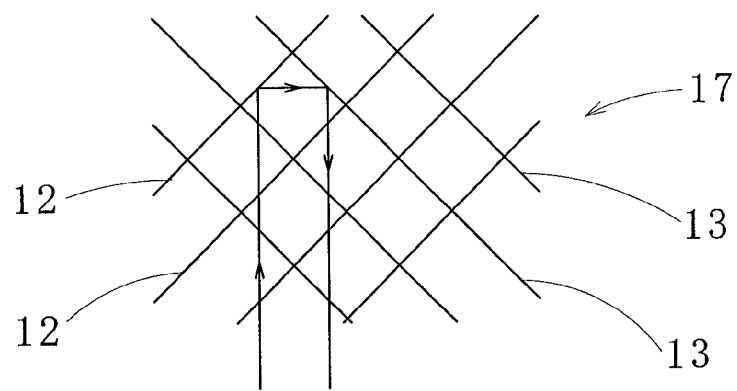

As illustrated in FIGS. 3(A) and 3(B), the first and the second reflective surfaces 12 and 13 comprised in the segment light-controlling panels 17 are formed inside a first and a second segment transparent plates 20 and 21, respectively. The first and the second reflective surfaces 12 and 13 are formed in strip shapes and are arranged numerously at a constant pitch (e.g., in a range of 0.1 to 1 mm) perpendicularly to one sides of the first and the second segment transparent plates 20 and 21, respectively. The numerous light-reflecting elements 14 are formed by disposing one sides of the first and the second segment transparent plates 20 and 21 to be adhered face-to-face in a manner that the first and the second reflective surfaces 12 and 13 are orthogonal to each other. Such a configuration enables simple manufacturing of a number of the light-reflecting elements 14 at low costs.

Moreover, the segment light-controlling panel 17 in a trapezoidal shape can be manufactured, e.g., by a method described below.

Figure 4:
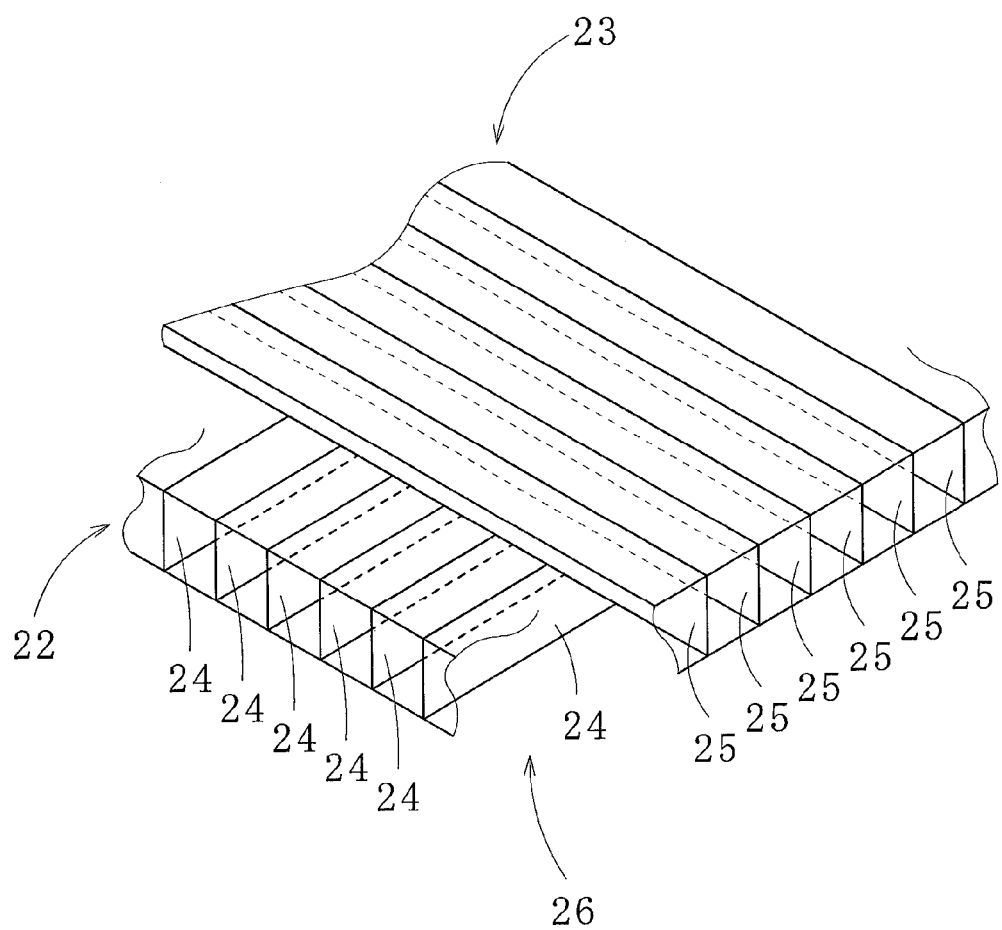
FIG. 4 an explanatory diagram illustrating a composite panel.

First, a number of plate-shaped transparent synthetic resin plates (e.g., acrylic resin plates or glass plates) each having a constant thickness and having a metallic reflection surface on one side thereof are laminated such that the metallic reflection surfaces are disposed at one side or the metallic reflection surfaces are adjoined each other, thereby manufacturing a laminated body. The metallic reflection surface is fabricated of a metal deposited layer (or a plated layer) of aluminum, silver, or the like, thereby being a double-sided reflective surface. Next, as illustrated in FIG. 4, a first and a second panels 22 and 23 are manufactured by being cut out from the laminated body in a manner that cut planes become perpendicular to the respective metallic reflection surfaces. Then, the first and the second panels 22 and 23 are closely attached face-to-face, e.g., fixed with a transparent adhesive agent, in a manner that metallic reflection surfaces 25 formed in the second panel 23 are orthogonal to metallic reflection surfaces 24 formed in the first panel 22, thereby forming a composite panel 26. Here, a pitch of the metallic reflection surfaces is equivalent to the thickness of the transparent synthetic resin plate or the glass plate, and a thickness of the first and the second panels is determined by a thickness at a time of being cut out of the laminated body.

Figure 5A:
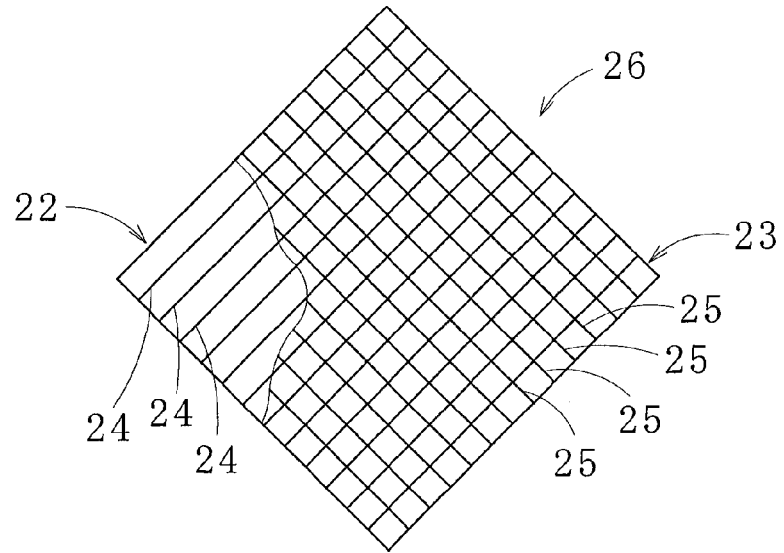
FIGS. 5 (A) and (B) are explanatory diagrams illustrating a manufacturing method of the segment light-controlling panel.
Figure 5B:
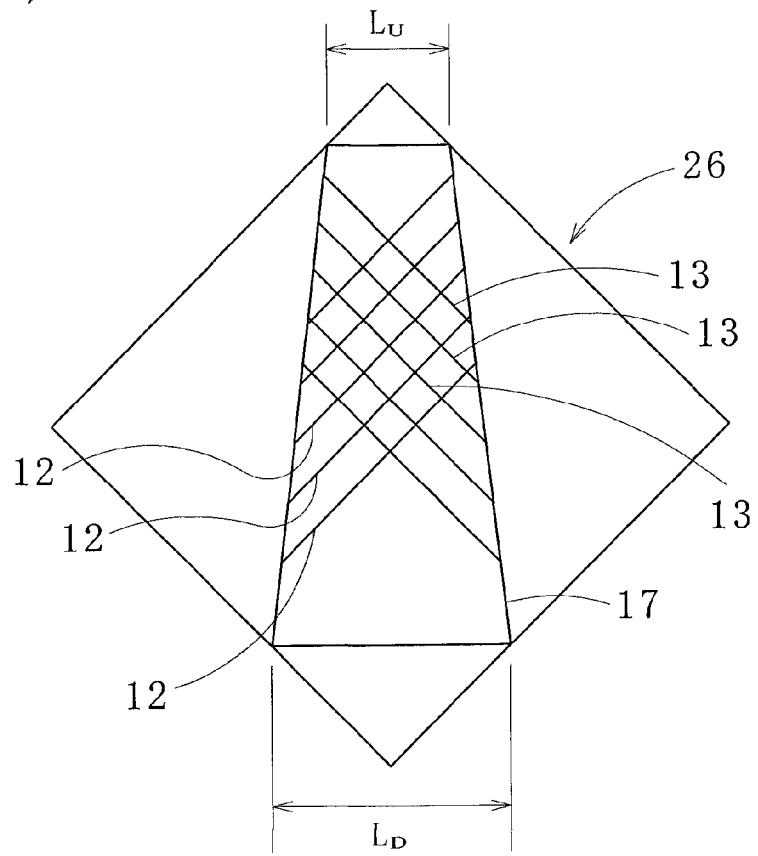

Next, as illustrated in FIG. 5(A), the composite panel 26 is placed horizontally and is rotated around the center thereof so that directions of the respective bisectors which bisect crossing angles (90 degrees) between the metallic reflection surfaces 24 formed in the first panel 22 and the second metallic reflection surfaces 25 formed in the second panel 23 become orthogonal to the horizontal direction in the composite panel 26 when viewed from thereabove. Then, as shown in FIG. 5(B), the segment light-controlling panel 17 is cut out of the composite panel 26 in a manner that an upper base and a lower base of the trapezoid are parallel to the horizontal direction and a centerline of the trapezoid coincides with one of the bisectors. Here, an upper-base length $L_U$ is $2R_I \cdot \sin(180/N)$ and a lower-base length $L_D$ is $2R_O \cdot \sin(180/N)$, where $R_I$ is a radius of the circumcircle of the object 11 when viewed from thereabove, and $R_O$ is a distance between the center and respective vertexes of the light-controlling panel 15 having a shape of a regular polygon with N sides when viewed from thereabove. Thereby, e.g., the first segment transparent plate 20 is fabricated of the first panel 22, and thus, the metallic reflection surfaces 24 formed in the first panel 22 become the first reflective surfaces 12. Furthermore, the second segment transparent plate 21 is fabricated of the second panel 23, and thus, the metallic reflection surfaces 25 formed in the second panel 23 become the second reflective surfaces 13. Moreover, all sides of the segment light-controlling panels 17 are subjected to light-shielding treatment to prevent light from falling incident through the sides between adjacent segment light-controlling panels 17.

The cut out segment light-controlling panels 17 in a trapezoidal shape are arranged as connected in a manner that the centerlines P thereof intersect at one point, thereby forming a shape of a regular polygon with N sides having a hole, which is also in the shape of a regular polygon with N sides, at the center thereof. Into the hole in the shape of a regular polygon with N sides, the light-shielding portion 18 also having the shape of a regular polygon with N sides and composed of an opaque member is inserted, thereby producing the light-controlling panel 15. Here, the metallic reflection surfaces 24 and 25 formed in the first and the second panels 22 and 23 are parallel, respectively, and the first segment transparent plate 20 is fabricated of the first plate 22, and the second segment transparent plate 21 is fabricated of the second panel 23. Therefore, when the segment light-controlling panel 17 is fabricated of the first and the second segment transparent plates 20 and 21, the first reflective surfaces 12 (metallic reflection surfaces 24 in the first panel 22) and the second reflective surfaces 13 (metallic reflection surfaces 25 in the second panel 23) included in the segment light-controlling panel 17 are parallel, respectively.

Furthermore, the segment light-controlling panel 17 in a trapezoidal shape may also be produced, e.g., as explained below.

Figure 6A:
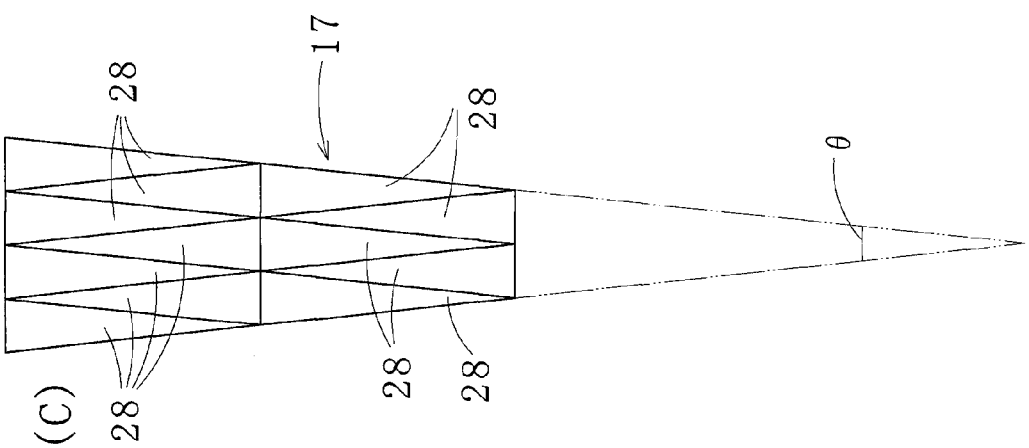
FIG. 6 (A)-(C) are explanatory diagrams illustrating a manufacturing method of the segment light-controlling panel.
Figure 6B:
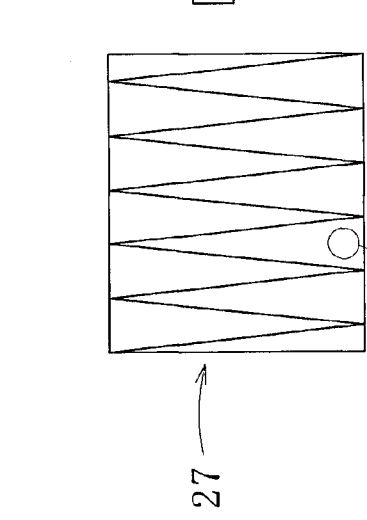
Figure 6C:
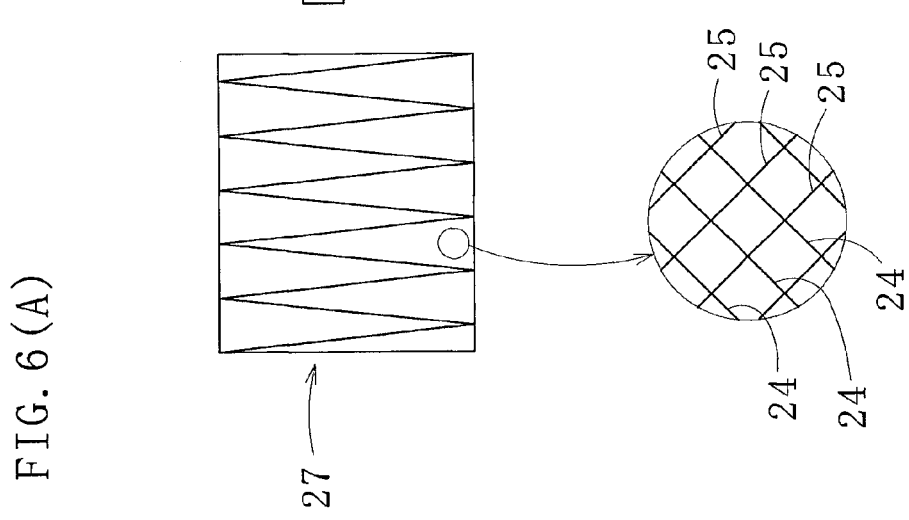

First, the composite panel 26 is placed horizontally and is rotated around the center thereof so that directions of the respective bisectors which bisect crossing angles (90 degrees) between the metallic reflection surfaces 24 formed in the first panel 22 and the second metallic reflection surfaces 25 formed in the second panel 23 become orthogonal to the horizontal direction in the composite panel 26 when viewed from thereabove. Then, as illustrated in FIG. 6(A), a rectangular-shaped substrate panel 27 is cut out from the composite panel 26, e.g., in a manner that one side thereof is parallel to the bisectors which bisect the crossing angles between the metallic reflection surfaces 24 and 25, and the other side orthogonal to the one side is orthogonal to the bisectors. Next, as illustrated in FIG. 6(B), isosceles triangle-shaped panel pieces 28 are cut out from the substrate panel 27 in a manner that a height thereof is equivalent to a length of one side of the substrate panel 27, and vertices thereof exist on the other sides opposite to each other, and the centerlines thereof coincide with one of the bisectors of the crossing angles between the metallic reflection surfaces 24 and 25. As illustrated in FIG. 6(C), the isosceles triangle-shaped panel pieces 28 are combined to form a trapezoidal shape, thereby forming the segment light-controlling panel 17. Here, when the segment light-controlling panel 17 is formed, centerlines of the respective isosceles triangle-shaped panel pieces 28 disposed at a central portion of the segment light-controlling panel 17 are linearly continuous and coincide with a centerline of the trapezoidal-shaped segment light-controlling panel 17. Thereby, e.g., the first segment transparent plate 20 is fabricated of the first panel 22, and thus, the metallic reflection surfaces 24 formed in the first panel 22 become the first reflective surfaces 12. Furthermore, the second segment transparent plate 21 is fabricated of the second panel 23, and thus, the metallic reflection surfaces 25 formed in the second panel 23 become the second reflective surfaces 13. Moreover, all sides of the respective panel pieces 28 are subjected to light-shielding treatment to prevent light from falling incident through the sides between adjacent panel pieces 28.

Here, the smaller an angle θ of a vertex opposing a base side in each of the isosceles triangle-shaped panel pieces 28, the larger the N becomes of the light-controlling panel 15 in a shape of a regular polygon with N sides formed by the combination of the segment light-controlling panels 17, which improves the ratio of the light-reflecting elements 14 existing on the centerlines P with respect to the light-reflecting elements 14 comprised in the light-controlling panel 15. As a result, the ratio of the light passing through the light-reflecting elements 14 by being reflected only once each at the first and the second reflective surfaces 12 and 13 can be relatively increased, thereby allowing the real image 16 to be brighter while preventing the appearance of the mirror image of the object 11.

Here, the thickness of the first and the second panels 22 and 23, which determines the thickness of the first and the second segment transparent plates 20 and 21, requires adjustment depending on a strength and a size of the segment light-controlling panel 17, however, the thickness is, e.g., in a range of 0.5 to 10 mm. When the first and the second reflective surfaces 12 and 13 have a pitch "q", a width of the first and the second reflective surfaces 12 and 13 is, e.g., in a range of 0.5"q" to 3"q" (preferably 0.9"q" to 1.1"q", more preferably "q"). When the width of the first and the second reflective surfaces 12 and 13 exceeds 3"q", light reflected by the first and the second reflective surfaces 12 and 13 will be reflected again by neighboring first and second reflective surfaces 12 and 13. Such a repetition of the reflection at the first and the second reflective surfaces 12 and 13 inhibits obtaining a sharp image. Meanwhile, when the width of the first and the second reflective surfaces 12 and 13 is less than 0.5"q", light reflected by the first and the second reflective surfaces 12 are 13 is reduced, which also inhibits obtaining a sharp image.

Since the real image 16 of the object 11 is formed at a position plane-symmetric to the object 11 with respect to the light-controlling panel 15, the size of the light-controlling panel 15 is determined considering a size of the object 11 when viewed from thereabove and a distance between the object 11 and the light-controlling panel 15. Once the size of the light-controlling panel 15 is determined, it is preferable to adjust the pitch "q" of the first and the second reflective surfaces 12 and 13 according to the size of the light-controlling panel 15. When the size of the light-controlling panel 15 is small, the pitch "q" of the first and the second reflective surfaces 12 and 13 is set small. Meanwhile, when the size of the light-controlling panel 15 is large, the pitch "q" of the first and the second reflective surfaces 12 and 13 is set large. For example, when the light-controlling panel 15 has a size of a square 100 mm on a side, the pitch "q" is determined in a range of 0.3 to 0.4 mm. When the light-controlling panel 15 has a size of a square 400 mm on a side, the pitch "q" is determined in a rage of 0.6 to 0.8 mm.

Next, an optical imaging method using the optical imaging apparatus 10 according to the first embodiment of the present invention will be described.

As illustrated in FIG. 2(B), when the light from the object 11, which is positioned in the cylindrical space 19 and at one side of the light-shielding portion 18, falls incident on the flat plate-shaped light-controlling panel 15 having the numerous light-reflecting elements 14, light rays with small incident angles with respect to the light-controlling panel 15 are intercepted by the light-shielding portion 18, and light rays with large incident angles (light rays incident obliquely) with respect to the light-controlling panel 15 fall incident on the segment light-controlling panels 17. As illustrated in FIG. 3, the light rays incident on the segment light-controlling panels 17 enter the light-reflecting elements 14 in the segment light-controlling panels 17 and are reflected by the first reflective surfaces 12. Then, the light rays reflected at the first reflective surfaces 12 further travel through the light-reflecting elements 14. Here, light rays reflected at points $a_1$, $a_2$, and $a_3$ of the first reflective surfaces 12 are further reflected at points $b_1$, $b_2$, and $b_3$ of the second reflective surface 13, respectively, thereby traveling through the light-reflecting elements 14 and are emitted outside from the light-reflecting elements 14. Some of the reflected light rays reflected by the first reflective surfaces 12 travel through the light-reflecting elements 14 without being reflected by the second reflective surfaces 13 and are emitted outside.

Since the first and the second reflective surfaces 12 are 13 are disposed orthogonally to each other while being disposed on different levels, twice-reflected light rays, i.e., light rays having been reflected at the points $a_1$, $a_2$, and $a_3$ of the first reflective surfaces 12 for the first time and then reflected at the points $b_1$, $b_2$, and $b_3$ of the second reflective surface 13 for the second time, respectively, become parallel to incident light rays being incident on the first reflective surfaces 12 when viewed from thereabove as illustrated in FIG. 3 (B). As a result, among the light falling incident on the optical imaging apparatus 10 from the object 11, reflected light having been reflected consecutively at the first and the second reflective surfaces 12 and 13 is converged at a symmetric position to the object 11 with respect to the light-controlling panel 15, thereby forming the real image 16 of the object 11 at a position plane-symmetric to the object 11 with respect to the light-controlling panel 15.

Meanwhile, the following light rays are not parallel to incident light rays being incident on the light-reflecting elements 14 when viewed from thereabove: light rays traveling through the light-reflecting elements 14 by being reflected at the first reflective surfaces 12 in the light-reflecting elements 14 and being directly emitted outside; and light rays entering the light-reflecting elements 14, being reflected at the second reflective surfaces 13, and being directly emitted outside from the light-reflecting elements 14. Therefore, the light emitted outside from the light-reflecting elements 14 will not intersect, thereby forming no image. Since the first and the second reflective surfaces 12 and 13 are the metallic reflection surfaces in the optical imaging apparatus 10, there is no limitation on incident angles of light to be reflected at the first and the second reflective surfaces 12 and 13, and a light reflection angle can be arbitrary. As a result, image forming can be performed in a wide range of angles.

Here, the light-controlling panel 15 is divided into a plurality of the segment light-controlling panels 17 wherein the first and the second reflective surfaces 12 and 13 included are parallel, respectively. Moreover, when the respective segment light-controlling panels 17 are viewed from thereabove, the centerlines P thereof are brought to intersect at one point on (at the center of) the light-controlling panel 15, and one of the bisectors which bisect the crossing angles between the first reflective surfaces 12 and the second reflective surfaces 13 of the light-reflecting elements 14 existing on the centerlines P are brought to coincide with the centerlines P when viewed from thereabove. Such a configuration improves the ratio of the light-reflecting elements 14 existing on the centerlines P with respect to the light-reflecting elements 14 included in the light-controlling panel 15. Because of the improved ratio of the light-reflecting elements 14 existing on the centerlines P, the ratio of the light passing through the light-reflecting elements 14 by being reflected only once each at the first and the second reflective surfaces 12 and 13 can be relatively increased, thereby allowing the real image 16 to be brighter while preventing the appearance of the mirror images of the object 11.

Moreover, the object 11 is placed at one side of the light-shielding portion 18 (below the light-shielding portion 18 in FIG. 2(B)), and in the cylindrical space 19 whose cross-section is the light-shielding portion 18 and having a central axis which is a perpendicular line passing through the point where the centerlines P of the respective segment light-controlling panels 17 intersect and being perpendicular to the light-shielding portion 18. Such a configuration allows, among the light from the object 11, light passing through the light-reflecting elements 14 without being reflected by the first or the second reflective surfaces 12 and 13 to be effectively intercepted. This prevents a background of an area where the real image 16 is formed from becoming bright carelessly. Furthermore, such a configuration allows light being incident on the light-shielding panel 15 at small incident angles and passing through the light-reflecting elements 14 by being reflected only once at either one of the first and the second reflective surfaces 12 and 13 to be effectively intercepted. As a result, the mirror images of the object 11 caused by transmitted light due to one-time reflection is substantially prevented from appearing and overlapping the real image 16.

Figure 7:
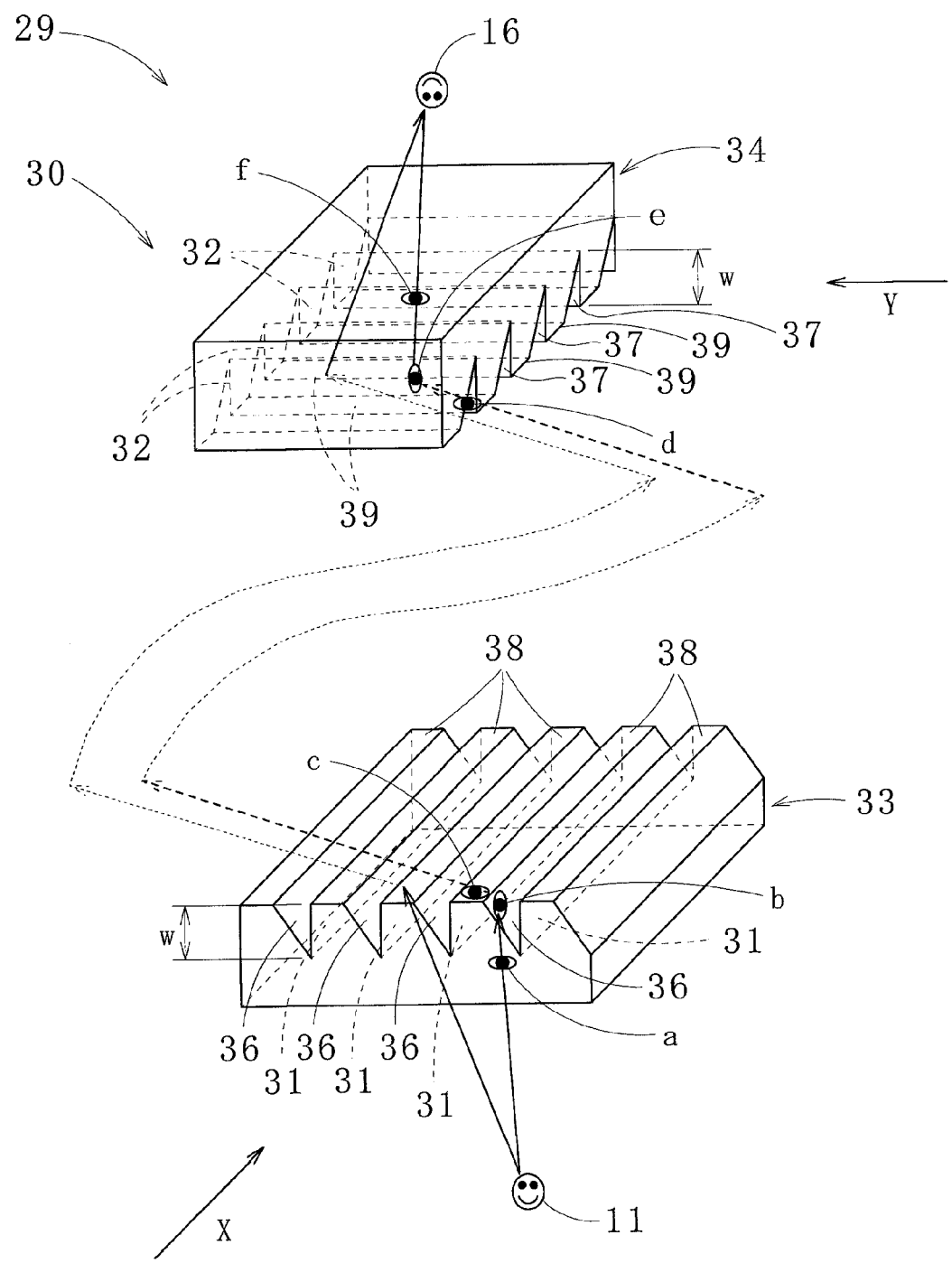
FIG. 7 an explanatory diagram illustrating light-reflecting elements provided to a light-controlling panel of an optical imaging apparatus according to a second embodiment of the present invention.

An optical imaging apparatus 29 according to a second embodiment of the present invention differs from the optical imaging apparatus 10 according to the first embodiment in that it comprises a segment light-controlling panel 30, as illustrated in FIGS. 7 and 8. Therefore, the segment light-controlling panel 30 will be described in detail hereunder, and components same as those with the optical imaging apparatus 10 will be indicated by the same numerals and description thereof will be omitted.

First and second reflective surfaces 31 and 32 included in the segment light-controlling panel 30 are formed inside first and second segment transparent plates (e.g., acrylic resin plates) 33 and 34, respectively, each having a thickness of 0.5 to 10 mm. The first and the second reflective surfaces 31 and 32 are in strip shapes and arranged numerously at a constant pitch (e.g., in a range of 0.1 to 1 mm) perpendicularly to one sides of the first and the second segment transparent plates 33 and 36, respectively. Then, one sides of the respective first and the second segment transparent plates 33 and 34 are disposed to be adhered face-to-face such that the first and the second reflective surfaces 31 and 32 are orthogonal to one another (an example of a crossed arrangement), thereby forming a number of light-reflecting elements 35. Such a configuration allows the numerous light-reflecting elements 35 to be manufactured simply at low costs. In FIG. 7, the first and the second segment transparent plates 33 and 34 are illustrated separately to clearly show traveling paths of the light.

Figure 8A:
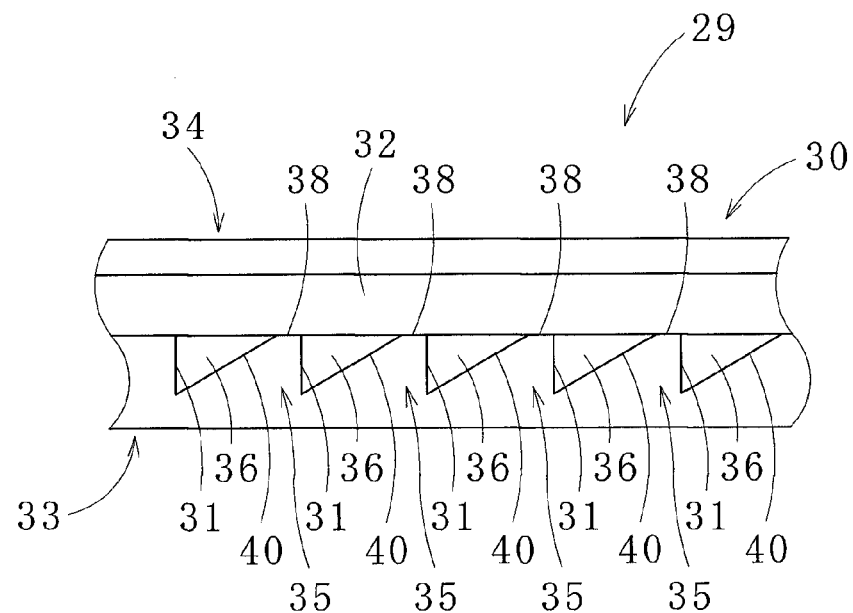
FIGS. 8 (A) and (B) are sectional views of FIG. 7 taken in the direction of arrows X and Y, respectively.
Figure 8B:
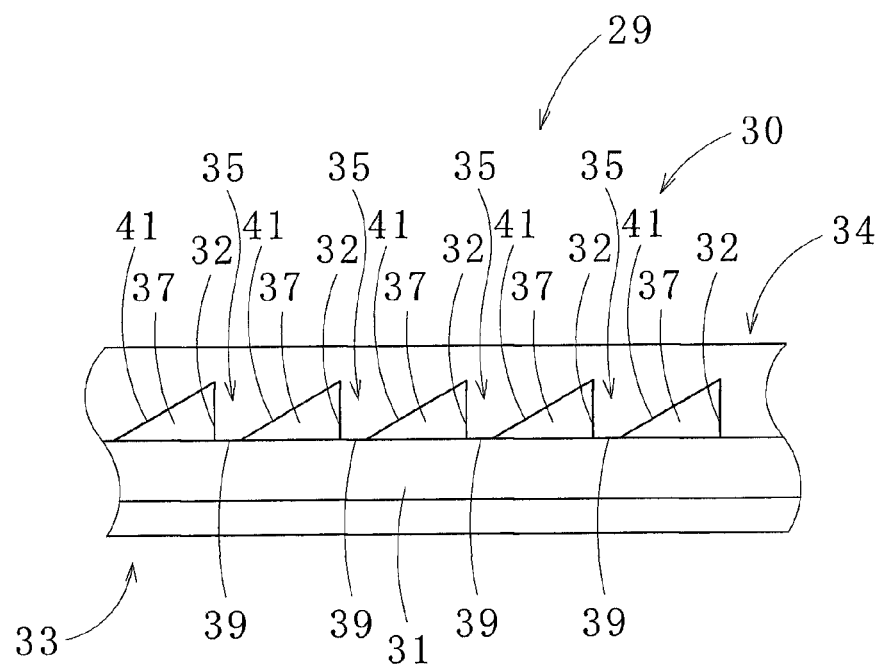

As illustrated in FIGS. 8(A) and 8(B), to the first and the second segment transparent plates 33 and 34, grooves 36 and 37 are provided, respectively, at a predetermined pitch same as that of the first and the second reflective surfaces 31 and 32. Each of the grooves 36 and 37 has a cross section of a right triangle having a vertical plane extending from one side of the transparent synthetic resin plate to the thickness direction thereof. The vertical planes of the grooves 36 and 37 serve as the first and the second reflective surfaces 31 and 32 for reflecting light incident obliquely into the first and the second segment transparent plates 33 and 34, respectively. Between the grooves 36 and between the grooves 37, light transmissive portions 38 and 39 are formed, composing light passing surfaces for allowing reflected light reflected by the first and the second reflective surfaces 31 and 32 to pass through, respectively. On the vertical planes of the grooves 36 and 37, a metal (e.g., silver) plated layer or a metal deposited layer (composing a metallic reflection surface) may be formed.

Although the first and the second segment transparent plates 33 and 34 can be manufactured by press forming using molds, it is preferable to manufacture by injecting a transparent synthetic resin into molds of prescribed shapes and finishing by solidification. Base shapes of the grooves 36 and 37 are formed on the molds beforehand so that when the first and the second segment transparent plates 33 and 34 are manufactured, the grooves 36 and 37 are formed on one sides of the first and the second segment transparent plates 33 and 34, respectively. Surfaces of the molds used for forming inclined planes 40 and 41 of the grooves 36 and 37 are subjected to shot-blasting treatment or surface-roughing treatment to be provided with concavities and convexities of, e.g., 3 μm to 50 μm. As a result, the inclined planes 40 and 41 of the groove 36 and 37 are subjected to light-scattering treatment by being formed with reversed concavities and convexities transferred from the concavities and convexities formed on the molds. In this embodiment, end portions of the first reflective surfaces 31 of the first segment transparent plate 33 and end portions of the second reflective surfaces 32 of the second segment transparent plate 34 are disposed to be in contact with each other.

As illustrated in FIG. 7, when the first and the second reflective surfaces 31 and 32 (grooves 36 and 37) have a pitch "p", a width "w" of the strip-shaped first and the second reflective surfaces 31 and 32 is, e.g., in a range of 0.5"p" to 3"p" (preferably 0.9"p" to 1.1"p", more preferably "p"). When the width of the first and the second reflective surfaces 31 and 32 exceeds 3"p", light reflected at the first and the second reflective surfaces 31 and 32 will be scattered at the inclined planes 40 and 41, and a part of the scattered light will be reflected again at the first and the second reflective surfaces 31 and 32. Such a repetition of the reflection inhibits obtaining a sharp image. Meanwhile, when the width of the first and the second reflective surfaces 31 and 32 is less than 0.5"p", light reflected by the first and the second reflective surfaces 31 and 32 is reduced, which also inhibits obtaining a sharp image.

Referring to FIGS. 2 and 7, an optical imaging method using the optical imaging apparatus 29 according to the second embodiment will now be described.

As illustrated in FIG. 2, when the light from the object 11 positioned at one side of the perpendicular line passing through the center of the light-shielding portion 18 falls incident on the flat plate-shaped light-controlling panel 15 having the numerous light-reflecting elements 35, light rays with small incident angles with respect to the light-controlling panel 15 are shielded by the light-shielding portion 18, and light rays with large incident angles (light rays incident obliquely) with respect to the light-controlling panel 15 fall incident on the segment light-controlling panel 30 illustrated in FIG. 7. A light ray incident on the segment light-controlling panel 30 advances into the first segment transparent plate 33 of the segment light-controlling panel 30 from an incident point "a". Since the air exists inside the grooves 36 and 37 (outer areas of the vertical planes), each having a cross section of a right triangle, an optical refraction index $n_m$ inside the segment light-controlling panel 30 (inner area of the vertical planes) is larger than an optical refraction index $n_a$ in outer areas of the vertical planes (i.e., optical refraction index of the air). Therefore, when a light ray advanced into the light-reflecting element 35 falls incident on the vertical plane with an incident angle θ which is larger than angle θ, satisfying an equation $\sin \theta_c = n_m/n_a$, total reflection of the light ray occurs at the vertical plane, and in this case, the vertical plane serves as the first reflective surface 31.

Then, the light ray totally reflected, e.g., at a reflection point "b" of the first reflective surface 31 reaches the light transmissive portion 38 and exits from a light exit point "c". Since the first and the second segment transparent plates 33 and 34 are adhered, the light exited from the light exit point "c" advances into the second segment transparent plate 34 from a light entry point "d" (adhered to the light exit point "c") of the light transmissive portion 39. Some of light rays totally reflected by the first reflective surfaces 31 advance into the second segment transparent plate 34 through the light transmissive portions 38 and 39 disposed in close contact with each other, and the rest of the light rays are scattered by the inclined planes 40, which have been subjected to the light-scattering treatment, and are attenuated. The light rays entered the second segment transparent plate 34 travel therethrough and reach the vertical planes of the grooves 37 each having a cross section of a right triangle. Among the light rays reached the vertical planes of the grooves 37, only for light rays being incident on the vertical planes (e.g., on a reflection point "e") with incident angles at which total reflection occurs, the vertical planes serve as the second reflective surfaces 32. Then, totally reflected light ray further travels through the second segment transparent plate 34, and is emitted outside from a light exit point "f" on the surface of the other side (a side not provided with the second reflective surfaces 32) of the second segment transparent plate 34.

Meanwhile, light rays being incident on the vertical planes of the first segment transparent plate 33 at incident angles smaller than the incident angle θ, are refracted at the vertical planes and enter the grooves 36, and some of the light rays are scattered at the inclined planes 40, which have been subjected to the light-scattering treatment, and are attenuated, and the rest of the light rays pass through the light transmissive portions 39 of the second segment transparent plate 34 and enter the second segment transparent plate 34. Among the light rays entered the second segment transparent plate 34, light rays totally reflected by the vertical planes of the grooves 37 and light rays directly traveling through the second segment transparent plate 34 reach to the other side of the second segment transparent plate 34 and are emitted outside from the surface at the other side. Moreover, light rays being incident on the vertical planes of the grooves 36 in the first segment transparent plate 33 with the incident angle θ, are reflected by the vertical planes of the grooves 36 and travel along the vertical planes into the second segment transparent plate 34 from the light transmissive portions 39 of the second segment transparent plate 34. Among the light rays advanced into the second segment transparent plate 34, some of the light rays are scattered by the inclined planes 41, which have been subjected to the light-scattering treatment, of the grooves 37, and the rest of the light rays are emitted outside from the surface at the other side of the second segment transparent plate 34. Furthermore, some light rays directly advance into the second segment transparent plate 34 from the first segment transparent plate 33 through the light transmissive portions 38 and 39, travel through the second segment transparent plate 34 and are emitted outside from the surface at the other side of the second segment transparent plate 34.

Here, the first and the second reflective surfaces 31 and 32 are disposed on different levels and are orthogonal to each other with upper ends of the first reflective surfaces 31 and lower ends of the second reflective surfaces 32 being in contact with each other. As a result, among light rays traveling through the second segment transparent plate 34 and being emitted outside from the surface of the other side of the second segment transparent plate 34, when incident light rays being incident on the first reflective surfaces 31 is reflected by the first reflective surfaces 31 for the first time and then reflected by the second reflective surfaces 32 for the second time, twice-reflected light rays are emitted at angles same as the incident angles of the incident light rays being incident on the first reflective surfaces 31. Accordingly, among the light falling incident on the light-controlling panel 15 from the object 11, reflected light having been reflected consecutively by the first and the second reflective surfaces 31 and 32 is converged at a position symmetric to the object 11 with respect to the light-controlling panel 15. As a result, the real image 16 of the object 11 is formed at a position plane-symmetric to the object 11 with respect to the light-controlling panel 15.

Meanwhile, the following light rays are not reflected at the same angles as incident light rays being incident on the first segment transparent plate 33: light rays passing through the grooves 36 of the first segment transparent plate 33, advancing into the second segment transparent plate 34, reaching the other side of the second segment transparent plate 34, and being emitted outside from the surface of the other side of the second segment transparent plate 34; light rays falling incident on the vertical planes of the grooves 36 in the first segment transparent plate 33 at an incident angle θ, traveling along the vertical planes of the grooves 36 to enter the second segment transparent plate 34, advancing to the other side of the second segment transparent plate 34, and being emitted outside from the surface of the other side of the second segment transparent plate 34; and light rays directly entering the second segment transparent plate 34 from the first segment transparent plate 33, traveling through the second segment transparent plate 34, and being emitted outside from the surface of the other side of the second segment transparent plate 34. Thus, the light rays emitted outside from the surface of the other side of the second segment transparent plate 34 will not intersect, thereby forming no image.

Here, the light-controlling panel 15 is divided, as illustrated in FIGS. 2 and 7, into a plurality of the segment light-controlling panels 30 wherein the first and the second reflective surfaces 31 and 32 included are parallel, respectively; and centerlines P of the respective segment light-controlling panels 30 when viewed from thereabove are made to intersect at one point on the light-controlling panel; and moreover, bisectors which bisect the crossing angles between the first and the second reflective surfaces 31 and 32 of the light-reflecting elements 35 existing on the centerlines P are made to coincide with the centerlines P when viewed from thereabove. Because of such a configuration, a ratio of the light-reflecting elements 35 existing on the centerlines P with respect to the light-reflecting elements 35 comprised in the light-controlling panel is improved. Improved ratio of the light-reflecting elements 35 existing on the centerlines P contributes to relatively increase a ratio of the light passing through the light-reflecting elements 35 after being reflected once each at the first and the second reflective surfaces 31 and 32, thereby allowing the real image 16 to be brighter while preventing the appearance of mirror images of the object 11.

Moreover, the object 11 is positioned at one side of the light-shielding portion 18 (below the light-shielding portion 18 in FIG. 2 (B)), and in the cylindrical space 19 having a central axis which is a perpendicular line passing through the point where the centerlines P of the respective segment light-controlling panels 30 intersect and being perpendicular to the light-shielding portion 18. Such a configuration allows, among the light from the object 11, light passing through the light-reflecting elements 35 without being reflected at the first reflective surfaces 31 or the second reflective surfaces 32, and light passing through the light-reflecting elements 35 by being reflected once at either one of the first and the second reflective surfaces 31 and 32 to be effectively intercepted. Therefore, mirror images of the object caused by transmitted light due to one-time reflection are substantially prevented from appearing and overlapping the real image 16.

Figure 9A:
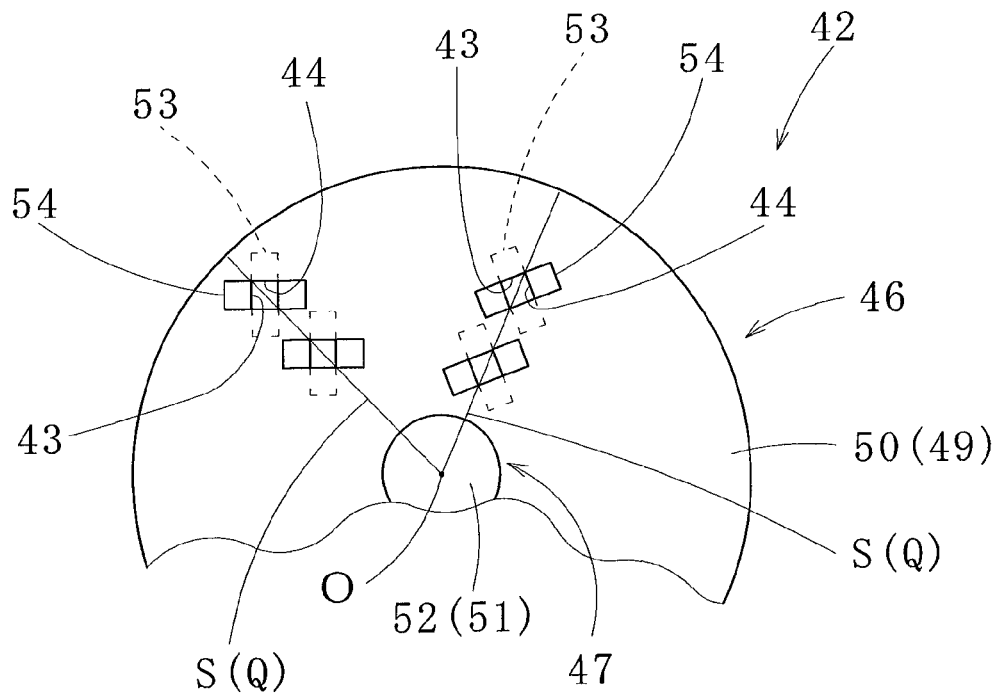
FIGS. 9 (A) and (B) are a plan view and a sectional side view illustrating an optical imaging apparatus according to a third embodiment of the present invention, respectively.
Figure 9B:
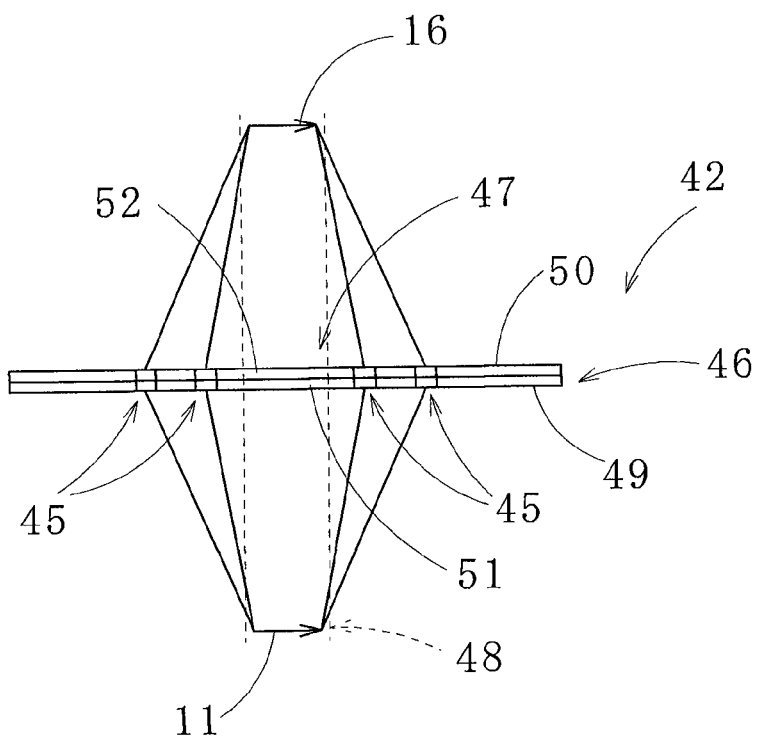
Figure 10:
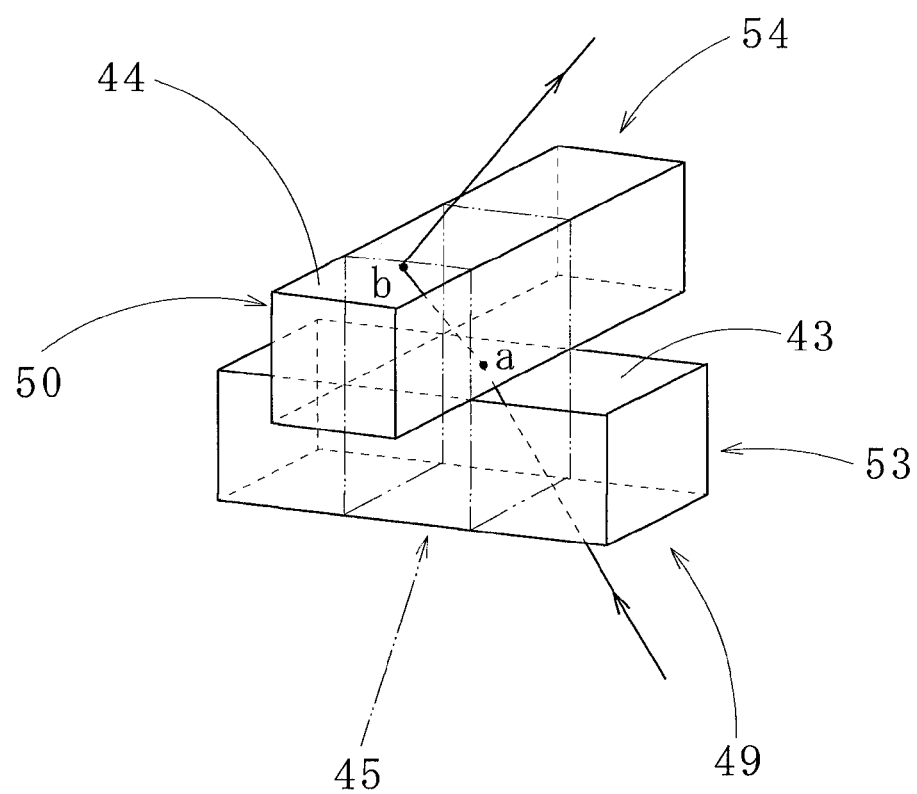
FIG. 10 an explanatory diagram illustrating light-reflecting elements provided to a light-controlling panel of the optical imaging apparatus.

An optical imaging apparatus 42 according to a third embodiment of the present invention, as illustrated in FIGS. 9(A), 9(B) and 10, comprises a flat plate-shaped light-controlling panel 46 having a number of light-reflecting elements 45 and forms the real image 16 of the object 11 at a position plane-symmetric to the object 11 with respect to the light-controlling panel 46. Each of the light-reflecting elements 45 allows the light from the object 11 to pass therethrough by reflecting the light at a first reflective surface 43 and further reflecting the light at a second reflective surface 44, which is disposed on a level different from that of the first reflective surface 43 while being paired with the first reflective surface 43, and in an orthogonal arrangement, which is an example of a crossed arrangement, with respect to the first reflective surface 43 when viewed from thereabove.

When the light-controlling panel 46 is viewed from thereabove, bisectors which bisect the crossing angles between the first and the second reflective surfaces 43 and 44 disposed in the light-controlling panel 46 intersect at the point O on the light-controlling panel 46. Moreover, centering around the point O, where the bisectors intersect, on the light-controlling panel 46, a flat plate-shaped light-shielding portion 47, where the light-reflective element 45 is absent, is formed. The object 11 is placed at one side of the light-shielding portion 47 (below the light-shielding portion 47 in FIG. 9 (B)), and in a cylindrical space 48 having a central axis which is a perpendicular line passing through the point and being perpendicular to the light-shielding portion 47, and whose cross-section is the light-shielding portion 47. Hereunder, more detailed explanation will be made.

The light-controlling panel 46 comprises a first and a second light-controlling panels 49 and 50, e.g., each composed of a circular-shaped transparent flat plate. In the first and the second light-controlling panels 49 and 50, light-shielding areas 51 and 52 are formed, respectively, by disposing opaque members concentrically with the centers of the first and the second light-controlling panels 49 and 50 and at circular-shaped areas having an area same as that of a circumcircle of the object 11 when viewed from thereabove. In the first and the second light-controlling panels 49 and 50, at outer areas of the light-shielding portions 51 and 52, a number of holes 53 and 54, each having a rectangular-shaped cross-section, are formed side by side perpendicularly in the thickness direction thereof, respectively. When the first and the second light-controlling panels 49 and 50 are stacked in a manner that centers of the cross-sectionally rectangular holes 53 and 54 are coincided and the holes 53 and 54 are orthogonally crossed, through-holes are formed in the thickness direction of the first and the second light-controlling panels 49 and 50. Here, diagonals Q of the respective through-holes intersect at the center of the first light-controlling panel 49, and diagonals S of the respective holes 54 intersect at the center of the second light-controlling panel 50 when viewed from thereabove.

Here, in each of the holes 53 formed in the first light-controlling panel 49, metallic surfaces, e.g., each composed of a metal deposited layer (or a plated layer) of aluminum, silver or the like (thereby being a double-sided reflective surface), are formed on lateral faces which are positioned at both sides of the diagonal Q and facing the center of the first light-controlling panel 49. Also, in each of the holes 54 formed in the second light-controlling panel 50, metallic surfaces, e.g., each composed of a metal deposited layer (or a plated layer) of aluminum, silver or the like (thereby being a double-sided reflective surface) are formed on lateral faces which are positioned at both sides of the diagonal S and facing the center of the second light-controlling panel 50. The first light-controlling panel 49 and the second light-controlling panel 50 are positioned and attached such that positions of the centers thereof are coincided and positions of the centers of the respective holes 53 and 54 provided therein are coincided.

Because of such a configuration, the metallic reflection surfaces formed in the first light-controlling panel 49 become the first reflective surfaces 43, and the metallic reflection surfaces formed in the second light-controlling panel 50 become the second reflective surfaces 44. As a result, a number of light-reflecting elements 45 can be formed in the light-controlling panel 46, each of which comprising the first reflective surface 43 and the second reflective surface 44, which is paired with the first reflective surface 43 and is disposed on a level different from that of the first reflective surface 43. Moreover, the diagonals Q and S of the holes in the first and the second light-controlling panels 49 and 50 when viewed from thereabove coincide with the bisectors that bisect the crossing angles between the first and the second reflective surfaces 43 and 44 of the light-reflecting elements 45, and thus, the bisectors intersect at the point O on (i.e., the center of) the light-controlling panel 46. Furthermore, the light-shielding areas 51 and 52 are stacked, thereby forming the light-shielding portion 47.

The first and the second light-controlling panels may be composed of opaque members. In this case, circular areas formed concentrically with the centers of the first and the second light-controlling panels 49 and 50 and having an area same with that of the circumcircle of the object 11 when viewed from thereabove become the light-shielding areas.

An optical imaging method using the optical imaging apparatus 42 according to the third embodiment of the present invention will now be described. As illustrated in FIG. 9 (B), when the light from the object 11 disposed in the cylindrical space 48 and at one side of the light-shielding portion 47 falls incident onto the flat plate-shaped light-controlling panel 46 having the numerous light-reflecting elements 45, light rays with small incident angles with respect to the light-controlling panel 46 are intercepted by the light-shielding portion 47, and light rays with large incident angles with respect to light-controlling panel 46 (light rays incident obliquely) fall incident onto the first light-controlling panel 49. The light rays incident on the first light-controlling panel 49 advance into the first light-controlling panel 49 and are reflected by the first reflective surfaces 43. Some of the light rays reflected by the first reflective surfaces 43 advance into the second light-controlling panel 50 from the first light-controlling panel 49, and are reflected by the second reflective surfaces 44 of the second light-controlling panel 50 and are emitted outside from the second light-controlling panel 50.

Since the respective first and the second reflective surfaces disposed perpendicularly are positioned on different levels with upper ends of the first reflective surfaces 43 and lower ends of the second reflective surfaces 44 being in contact with each other, twice-reflected light rays having been reflected by the first reflective surfaces 43 for the first time and the second reflective surfaces 44 for the second time become parallel to incident light rays being incident on the first reflective surfaces 43 when viewed from thereabove. As a result, among the light falling incident on the optical imaging apparatus 42 from the object 11, reflected light having been reflected consecutively by the first and the second reflective surfaces 43 and 44 is converged at a position symmetric to the object 11 with respect to the light-controlling panel 46, thereby forming the real image 16 of the object 11 at a position plane-symmetric to the object 11 with respect to the light-controlling panel 46.

Meanwhile, the following light rays are not parallel to the incident light rays being incident on the first light-controlling panel 49 when viewed from thereabove; light rays traveling through the first light-controlling panel 49 by being reflected at the first reflective surfaces 43 of the first light-controlling panel 49, advancing directly into the second light-controlling panel 50, traveling through the second light-controlling panel 50, and being emitted outside; and light rays passing through the first light-controlling panel 49, advancing into the second light-controlling panel 50, being reflected by the second reflective surfaces 44, and being emitted outside from the second light-controlling panel 50. Therefore, the light rays emitted outside from the second light-controlling panel 50 will not intersect, thereby forming no image.

In the light-controlling panel 46 when viewed from thereabove, the bisectors which bisect the crossing angles between the first and the second reflective surfaces 43 and 44 of the respective light-reflecting elements 45 intersect at the center of the light-controlling panel 46. As a result, the ratio of the light passing through the light-reflecting elements 45 after being reflected only once at each of the first and the second reflective surfaces 43 and 44 is relatively increased, thereby allowing the real image 16 to be brighter while preventing the appearance of the mirror images of the object 11. Moreover, the object 11 is placed at one side of the light-shielding portion 47 (below the light-shielding portion 47, in FIG. 9 (B)), and in the cylindrical space 48 having a central axis which is a perpendicular line passing through the center of the light-controlling panel 46 and being perpendicular to the light-shielding portion 47, and whose cross-section is the light-shielding portion 47. Therefore, among the light from the object 11, the following light is effectively intercepted: light passing directly through the light-reflecting elements 45 without being reflected by the first or the second reflective surfaces 43 and 44; and light falling incident on the light-controlling panel 46 at small incident angles and passing through the light-reflecting elements 45 after being reflected only once at either one of the first and the second reflective surfaces 43 and 44. Such a configuration substantially prevents the mirror images of the object 11 caused by transmitted light due to one-time reflection from appearing and overlapping the real image 16.

Figure 11A:
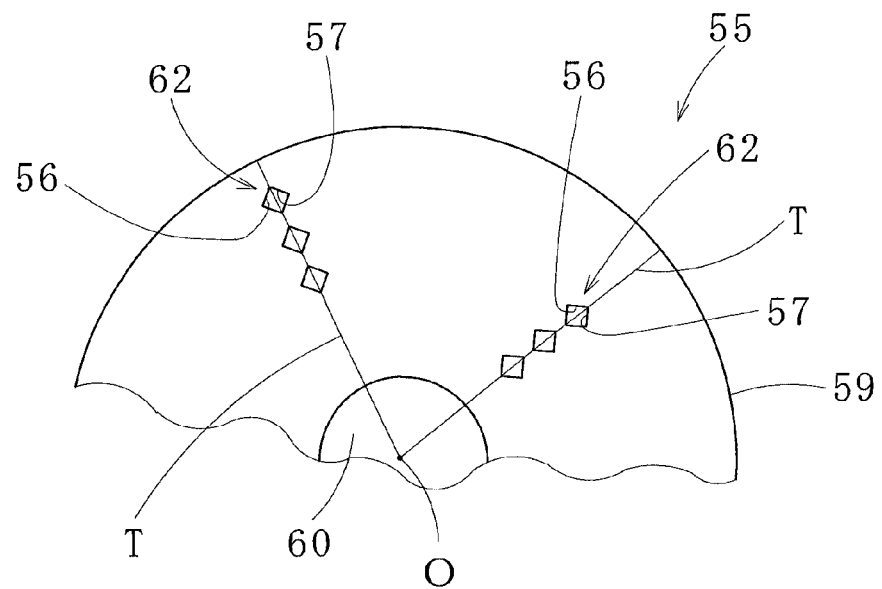
FIGS. 11 (A) and (B) are a plan view and a sectional side view illustrating an optical imaging apparatus according to a fourth embodiment of the present invention, respectively.
Figure 11B:
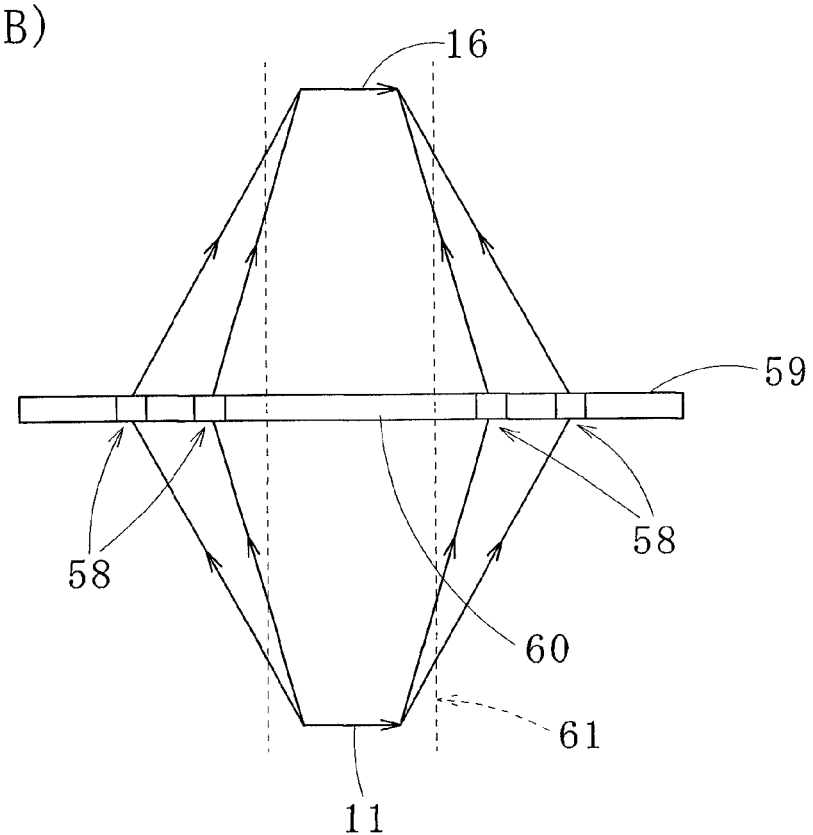
Figure 12:
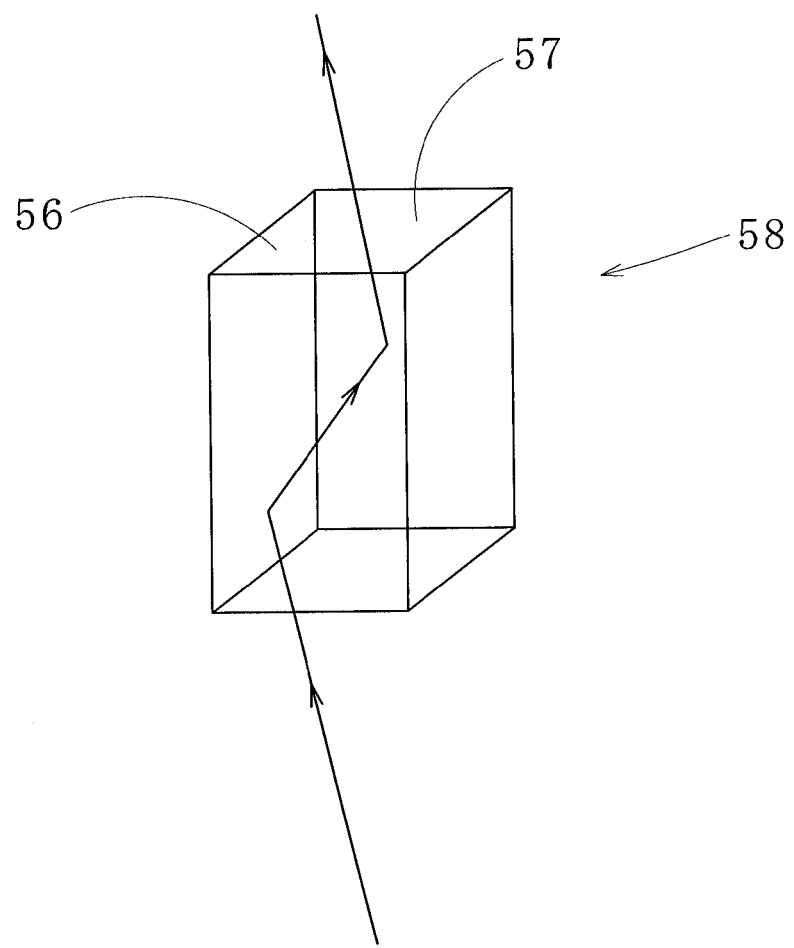
FIG. 12 an explanatory diagram illustrating light-reflecting elements provided to a light-controlling panel of the optical imaging apparatus.

An optical imaging apparatus 55 according to a fourth embodiment of the present invention, as illustrated in FIGS. 11(A), 11(B), and 12, comprises a flat plate-shaped light-controlling panel 59 having a number of light-reflecting elements 58 and forms the real image 16 of the object 11 at a position plane-symmetric to the object 11 with respect to the light-controlling panel 59. Each of the light-reflecting elements 58 allows light from the object 11 to pass therethrough by reflecting the light at a first reflective surface 56 and further reflecting the light at a second reflective surface 57, which is disposed in a crossed arrangement, e.g., orthogonal arrangement, with respect to the first reflective surface 56. When the light-controlling panel 59 is viewed from thereabove, bisectors which bisect crossing angles between the first and the second reflective surfaces 56 and 57 of the respective light-reflecting elements 58 disposed in the light-controlling panel 59 intersect at the point O on the light-controlling panel 59. Moreover, centering around the point O, where the bisectors intersect, on the light-controlling panel 59, a flat plate-shaped light-shielding portion 60 having no light-reflecting element 58 is formed at a circular area having a radius same as that of the circumcircle of the object 11 when viewed from thereabove. Then, the object 11 is placed at one side of the light-shielding portion 60 (downward in FIG. 11 (B)), and in a cylindrical space 61 having a central axis which is a perpendicular line passing through the center of the light-shielding portion 60, and whose cross-section is the light-shielding portion 60. Hereunder, more detailed explanation will be made.

The light-controlling panel 59 is, e.g., circular plate-shaped and provided with a number of holes 62, each having a square-shaped cross section, in the thickness direction thereof at an outer area of the light-shielding portion 60. When each of the cross-sectionally square holes is plan-viewed, among two pairs of diagonals, one diagonal T is in a radius direction of the light-controlling panel 59, and the other diagonal is orthogonal to the radius direction of the light-controlling panel 59. Here, in each of the holes 62, metallic reflection surfaces, for example, each composed of a metal deposited layer (or a plated layer) of aluminum, silver or the like (thereby being a double-sided reflective surface), are formed on lateral faces which are situated on both sides of the diagonal T and facing the center of the light-controlling panel 59.

Because of such a configuration, in each of the holes 62 formed in the light-controlling panel 59, the metallic reflection surface formed on the lateral face situated on one side of the diagonal T serves as the first reflective surface 56, and the metallic reflection surface formed on another lateral face situated on the other side of the diagonal T serves as the second reflective surface 57. As a result, a number of the light-reflecting elements 58, each having the first reflective surface 56 and the second reflective surface 57 positioned orthogonally to the first reflective surface 56, can be formed in the light-controlling panel 59. Moreover, when each of the holes 62 formed in the light-controlling panel 59 is viewed from thereabove, the diagonal T coincides with the bisector which bisect the crossing angle between the first and the second reflective surfaces 56 and 57 in the light-reflecting element 58 when viewed from thereabove.

An optical imaging method using the optical imaging apparatus 55 according to the fourth embodiment of the present invention will now be described. As illustrated in FIG. 11(B), when the light falls incident onto the flat plate-shaped light-controlling panel 59 having a number of light-reflecting elements 58 from the object 11 disposed in the cylindrical space 61 and at one side of the light-shielding portion 60, light rays with small incident angles with respect to the light-controlling panel 59 are intercepted by the light-shielding portion 60, and light rays with large incident angles with respect to the light-controlling panel 59 (light rays being incident obliquely) fall incident on the light-controlling panel 59. The light rays being incident on the light-controlling panel 59 advance into the light-reflecting elements 58 of the light-controlling panel 59. Some of the light rays are reflected by the first reflective surfaces 56, and the reflected light rays are further reflected by the second reflective surfaces 57, travel further through the light-reflecting elements 58, and are emitted outside. Here, among the reflected light rays reflected by the first reflective surfaces 56, some of the light rays travel through the light-reflecting elements 58 and are emitted outside from the light-controlling panel 59. Meanwhile, some of the light rays being incident into the light-reflecting elements 58 but not reflected by the first reflective surfaces 56 travel through the light-reflecting elements 58 after being reflected by the second reflective surfaces 57 and are emitted outside. The rest of the light rays not reflected by the first reflective surfaces 56 travel through the light-reflecting elements 58 without being reflected by the second reflective surfaces 57 and are emitted outside from the light-controlling panel 59.

Here, the first and the second reflective surfaces 56 are 57 are disposed facing orthogonally to each other. Therefore, when light rays traveling through the light-reflecting elements 58 and being incident on the first reflective surfaces 56 are reflected by the first reflective surfaces 56 for the first time and the reflected light rays are reflected by the second reflective surfaces 57 for the second time, twice-reflected light rays become parallel to incident light rays being incident on the first reflective surfaces 56 when viewed from thereabove. As a result, among the light falling incident on the optical imaging apparatus 55 from the object 11, reflected light having been reflected consecutively by the first and the second reflective surfaces 56 and 57 is converged at a position symmetric to the object with respect to the light-controlling panel 59, thereby forming the real image 16 of the object 11 at a position plane-symmetric to the object 11 with respect to the light-controlling panel 59.

Meanwhile, the following light rays are not parallel to the incident light rays being incident on the first reflective surfaces 56 when viewed from thereabove: light rays traveling through the light-reflecting elements 58 by being reflected by the first reflective surfaces 56 in the light-reflecting element 58, and being directly emitted outside from the light-reflecting elements 58 (light-controlling panel 59); and light rays being not reflected by the first reflective surfaces 56 of the light-reflecting element 58, but being reflected by the second reflective surfaces 57, and being directly emitted outside from the light-reflecting elements 58 (light-controlling panel 59). Therefore, the light rays emitted outside from the light-controlling panel 59 will not intersect, thereby forming no image.

Here, in the light-controlling panel 59, the bisectors which bisect the crossing angles formed between the first and the second reflective surfaces 56 and 57 of the respective light-reflecting elements 58 when viewed from thereabove intersect at the center of the light-controlling panel 59. As a result, a ratio of light passing through the light-reflecting elements 58 by being reflected only once at each of the first and the second reflective surfaces 56 and 57 is relatively increased, thereby allowing the real image 16 to be brighter while preventing the appearance of the mirror images of the object 11 caused by light passing through the light-reflecting elements 58 by being reflected only once at either one of the first and the second reflective surfaces 56 and 57. Moreover, among the light from the object 11 disposed on one side of the light-shielding portion 60 and in the cylindrical space 61, light directly passing through the light-reflecting elements 58 without being reflected at the first reflective surfaces 56 or the second reflective surfaces 57 of the light-reflecting elements 58, and light passing through the light-reflecting elements 58 by being reflected once at either one of the first and the second reflective surfaces 56 and 57 can be effectively intercepted. Therefore, mirror images of the object caused by transmitted light due to one-time reflection can be substantially prevented from appearing and overlapping the real image 16.

Figure 13A:
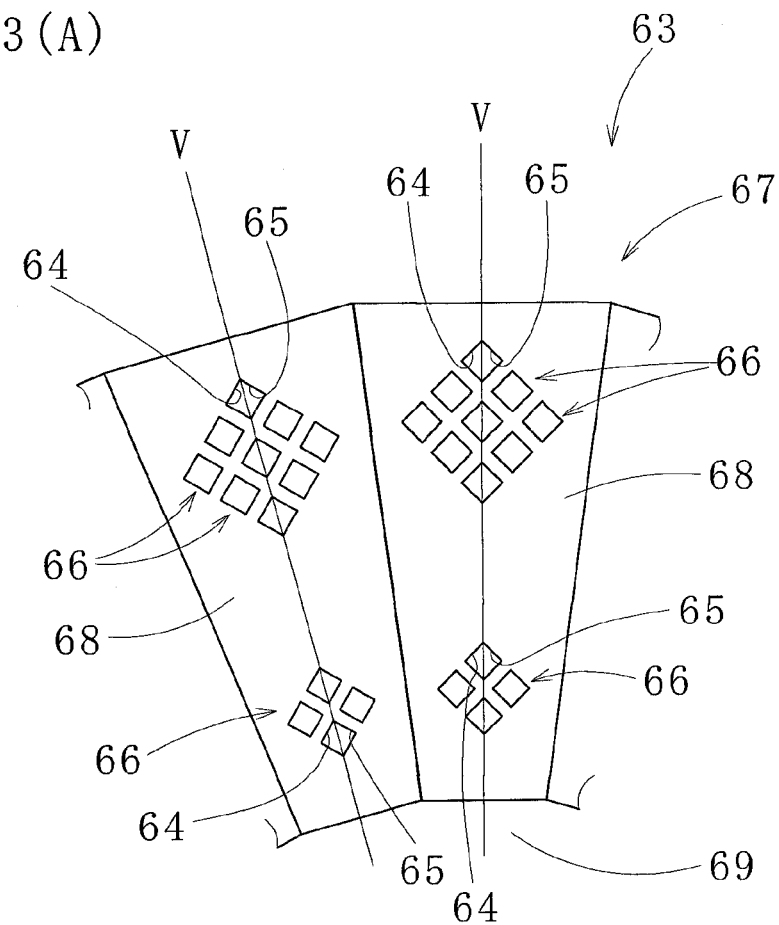
FIGS. 13 (A) and (B) are a plan view and a sectional side view illustrating an optical imaging apparatus according to a fifth embodiment of the present invention, respectively.
Figure 13B:
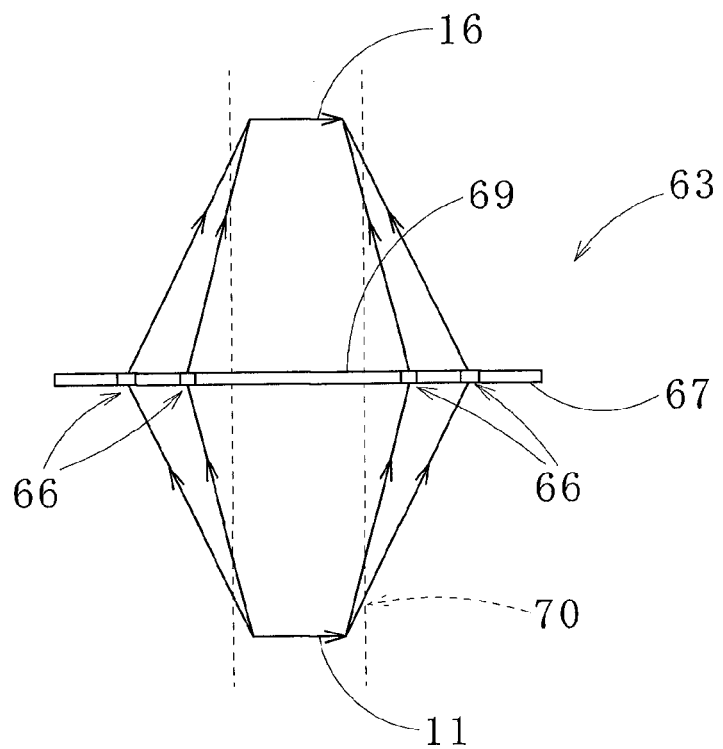

An optical imaging apparatus 63 according to a fifth embodiment of the present invention, as illustrated in FIGS. 13(A) and 13(B), comprises a flat plate-shaped light-controlling panel 67 having a number of light-reflecting elements 66 and forms the real image 16 of the object 11 at a position plane-symmetric to the object 11 with respect to the light-controlling panel 67. Each of the light-reflecting elements 66 allows light from the object 11 to pass therethrough by reflecting the light by a first reflective surface 64 and further reflecting the light by a second reflective surface 65, which is disposed in a crossed arrangement, e.g., orthogonal arrangement, with respect to the first reflective surface 64. Here, the light-controlling panel 67 is divided into a plurality of segment light-controlling panels 68 wherein the first and the second reflective surfaces 64 and 65 included are parallel, respectively. When the respective segment light-controlling panels 68 are plan-viewed, centerlines V thereof intersect at one point on the light-controlling panel 67, and moreover, bisectors which bisect crossing angles between the first and the second reflective surfaces 64 and 65 of the light-reflecting elements 66 existing on the centerlines V coincide with the centerlines V when viewed from thereabove. In a case where the segment light-controlling panels 68 have a trapezoidal shape of a same size, the light-controlling panel 67 formed by arranging the segment light-controlling panels 68 with no gap therebetween in a manner that the centerlines V of the segment light-controlling panels 68 intersect at one point becomes a regular polygon with M sides when viewed from thereabove.

Moreover, in the light-controlling panel 67, a flat plate-shaped light-shielding portion 69, where the light-reflecting element 66 is not provided, is formed centering around the point on which the centerlines V of the respective segment light-controlling panels 68 intersect. The object 11 is placed at one side of (in FIG. 13 (B), below) the light-shielding portion 69, and in a cylindrical space 70 having a central axis which is a perpendicular line passing through the point and being perpendicular to the light-shielding portion 69, and whose cross-section is the light-shielding portion 69. When the segment light-controlling panels 68 are in a trapezoidal shape, the light-shielding portion 69 when viewed from thereabove becomes e.g., a regular polygon with M sides, which circumscribes the circumcircle of the object 11 when viewed from thereabove. The light-shielding portion 69 allows, among the light from the object 11, light rays passing through the light-reflecting elements 66 without being reflected at the first reflective surface 64 or at the second reflective surface 65 (non-reflected light rays) to be intercepted. The light-shielding portion 69 also allows, among the light from the object 11, light rays falling incident on the light-controlling panel 67 at small incident angles and passing through the light-reflecting elements 66 by being reflected only once at either one of the first and the second reflective surfaces 64 and 65 to be effectively intercepted. Such a configuration prevents mirror images of the object 11 caused by one-time reflection at either one of the first and the second reflective surfaces 64 and 65 from appearing as ghost or noise disturbing the real image 16.

Here, the "M" is an integral number, e.g., in a range of 4 to 100. The larger the M is, the more improved a ratio of the light-reflecting elements 66 existing on the centerlines V with respect to the light-reflecting elements 66 comprised in the light-controlling panel 67. Improved ratio of the light-reflecting elements 66 existing on the centerlines V contributes to relatively increase a ratio of light passing through the light-reflecting elements 66 by being reflected only once each by the first and the second reflective surfaces 64 and 65 (i.e., relatively decrease a ratio of light passing through the light-reflecting elements 66 by being reflected only once at either one of the first and the second reflective surfaces 64 and 65), thereby allowing the real image to be brighter while preventing the appearance of mirror images of the object 11.

Here, the segment light-controlling panel 68 of a trapezoidal shape can be manufactured, e.g., by a method described below.

Figure 14A:
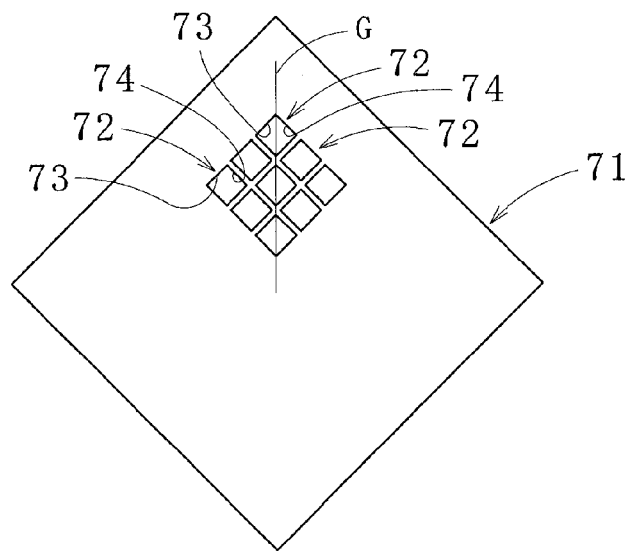
FIGS. 14 (A) and (B) are explanatory diagrams illustrating a manufacturing method of a segment light-controlling panel.
Figure 14B:
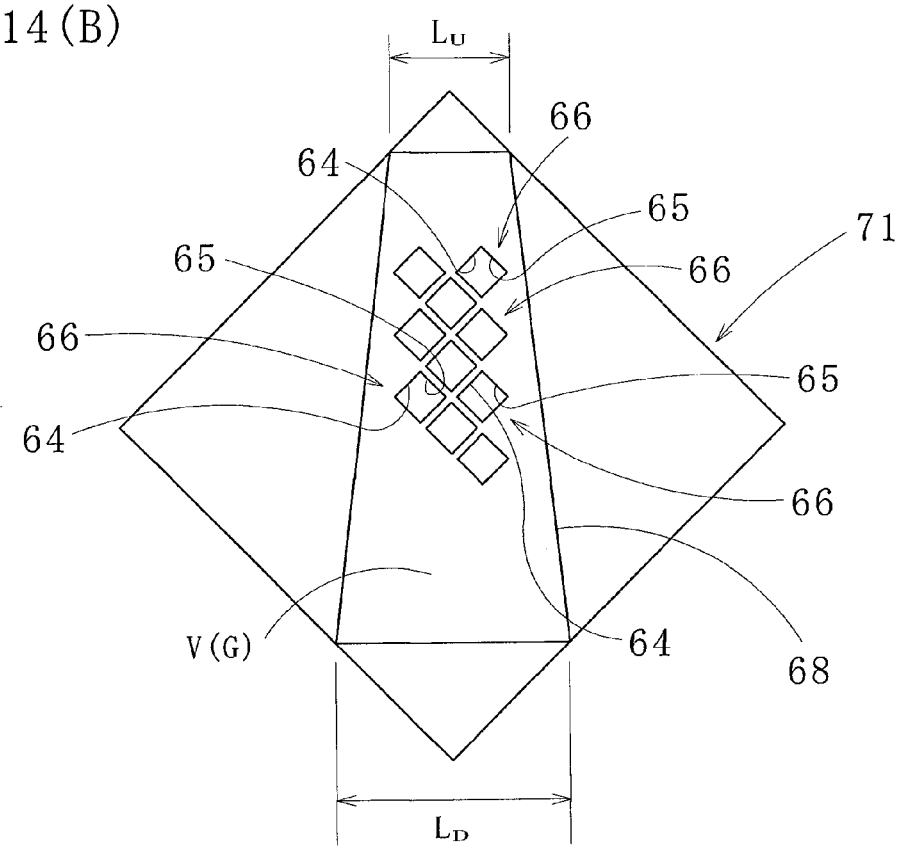

First, as illustrated in FIG. 14(A), a number of holes 72 having a square-shaped cross-section are formed parallel to each other at a constant interval on a raw panel 71 vertically in the thickness direction thereof. When each of the cross-sectionally square-shaped holes 72 is plan-viewed, metallic reflection surfaces 73 and 74, e.g., each composed of a metal deposited layer (or a plated layer) of aluminum, silver or the like (thereby being double-sided reflective surface), are formed on one of two pairs of lateral faces situated on both sides of a diagonal G, which is one of two pairs of diagonals of the each hole 72. Next, the raw panel 71 is placed horizontally and is rotated around the center thereof so that directions of the respective bisectors (diagonals G) which bisect crossing angles (90 degrees) between the metallic reflection surfaces 73 and 74 formed in the holes 72 in the raw plate 71 become orthogonal to the horizontal direction when viewed from thereabove. Then, as shown in FIG. 14(B), the segment light-controlling panel 68 is cut out of the raw panel 71 such that upper base and lower base of the trapezoid are parallel to the horizontal direction and a centerline of the trapezoid coincides with one of the bisectors (diagonals G). Here, an upper-base length $L_U$ is $2R_I \cdot \sin(180/M)$ and a lower-base length $L_D$ is $2R_O \cdot \sin(180/M)$ (see FIG. 14(B)), where $R_I$ is a radius of the circumcircle of the object 11 when viewed from thereabove, and $R_O$ is a distance between the center O and respective vertexes of the light-controlling panel 15 (see FIG. 2) having a shape of a regular polygon with M sides when viewed from thereabove. Thereby, e.g., the metallic reflection surfaces 73 become the first reflective surfaces 64, and the metallic reflection surfaces 74 become the second reflective surfaces 65.

The cut out segment light-controlling panels 68 in a trapezoidal shape are arranged as connected in a manner that the centerlines V thereof intersect at one point, thereby forming a shape of a regular polygon with M sides having a hole, which is also in the shape of a regular polygon with M sides, at the center thereof. Into the hole in the shape of a regular polygon with M sides, the light-shielding portion 69 also having the shape of a regular polygon with M sides and composed of an opaque member is inserted, thereby producing the light-controlling panel 67. Here, since the metallic reflection surfaces 73 and 74 formed in the respective holes 72 are parallel, respectively, the first reflective surfaces 64 (metallic reflection surfaces 73 of the raw panel 71) and the second reflective surfaces 65 (metallic reflection surfaces 74 of the raw panel 71) included in the segment light-controlling panel 68 are parallel, respectively.

Furthermore, the segment light-controlling panel 68 of a trapezoidal shape can also be manufactured, e.g., by a method described below.

First, the raw panel 71 is placed horizontally and is rotated around the center thereof so that directions of the respective bisectors which bisect the crossing angles (90 degrees) between the metallic reflection surfaces 73 and 74 in the raw panel 71 when viewed from thereabove become orthogonal to the horizontal direction. Next, as illustrated in FIG. 15(A), a rectangular-shaped base panel 75 is cut out of the raw panel 71, e.g., in a manner that one side thereof is parallel to the bisectors which bisect the crossing angles between the metallic reflection surfaces 73 and 74 and the other side orthogonal to the one side becomes orthogonal to the bisectors. Then, as illustrated in FIG. 15(B), isosceles triangle-shaped panel pieces 76 are cut out from the base panel 75 in a manner that a height thereof is equivalent to a length of one side of the base panel 75, and vertices thereof exist on the other sides opposite each other, and moreover, the centerline thereof coincide with one of the bisectors which bisect the crossing angles between the metallic reflection surfaces 73 and 74. As illustrated in FIG. 15(C), the isosceles triangle-shaped panel pieces 76 are combined to form a trapezoidal shape, thereby forming the segment light-controlling panel 68. Here, when the segment light-controlling panel 68 is formed, centerlines of the isosceles triangle-shaped panel pieces 68 disposed at a central portion of the segment light-controlling panel 68 are linearly continuous and are brought to coincide with a centerline of the trapezoidal-shaped segment light-controlling panel 68. Because of such a configuration, e.g., the metallic reflection surfaces 73 and the metallic reflection surfaces 74 formed in the respective holes 72 become the first and the second reflective surfaces 64 and 65, respectively. Moreover, all sides of the panel pieces 76 are subjected to light-shielding treatment to prevent light from falling incident through the sides between adjacent panel pieces 76.

Here, the smaller the angle θ of the vertex opposing the bottom side in each of the isosceles triangle-shaped panel pieces 76, the larger the M becomes of the light-controlling panel 67 in a shape of a regular polygon with M sides formed by the combination of the segment light-controlling panels 68, which improves the ratio of the light-reflecting elements 66 existing on the centerlines V with respect to the light-reflecting elements 66 comprised in the light-controlling panel 67. As a result, the ratio of the light passing through the light-reflecting elements 66 by being reflected only once each by the first and the second reflective surfaces 64 and 65 can be increased, thereby allowing the real image to be brighter while preventing the appearance of mirror images of the object 11.

An optical imaging method using the optical imaging apparatus 63 according to the fifth embodiment of the present invention will now be described.

As illustrated in FIG. 13(B), when the light from the object 11 positioned inside the cylindrical space 70 and at one side of the light-shielding portion 69 falls incident on the flat plate-shaped light-controlling panel 67 having a number of the light-reflecting elements 66, light rays having small incident angles with respect to the light-controlling panel 67 are intercepted by the light-shielding portion 69, and light rays having large incident angles (incident obliquely) fall incident onto the light-controlling panel 67. The light rays incident on the light-controlling panel 67 enter the light-reflecting elements 66 of the light-controlling panel 67. Then, some of the light rays are reflected by the first reflective surfaces 64, and the reflected light rays are further reflected by the second reflective surfaces 65, thereby further traveling through the light-reflecting elements 66 and are emitted outside. Here, among the reflected light rays reflected by the first reflective surfaces 64, some of the light rays travel through the light-reflecting elements 66 and are emitted outside from the light-controlling panel 67. Meanwhile, some of the light rays being incident into the light-reflecting elements 66 and being not reflected by the first reflective surfaces 64 are reflected by the second reflective surfaces 65, thereby traveling through the light-reflecting elements 66, and are emitted outside. Moreover, the rest of the light rays not reflected by the first reflective surfaces 64 travel through the light-reflecting elements 66 without being reflected by the second reflective surfaces 65 and are emitted outside from the light-controlling panel 67.

Here, the light-controlling panel 67 is divided into a plurality of the segment light-controlling panels 68 wherein the first and the second reflective surfaces 64 and 65 included are parallel, respectively. Moreover, when the respective segment light-controlling panels 68 are plan-viewed, the centerlines V thereof are brought to intersect at the center of the light-controlling panel 67, and bisectors which bisect the crossing angles between the first and the second reflective surfaces 64 and 65 of the light-reflecting elements 66 existing on the centerlines V are brought to coincide with the centerlines V when viewed from thereabove. Such a configuration improves the ratio of the light-reflecting elements 66 existing on the centerlines V with respect to the light-reflecting elements 66 comprised in the light-controlling panel 67. Improved ratio of the light-reflecting elements 66 existing on the centerlines V contributes to relatively increase the ratio of the light passing through the light-reflecting elements 66 by being reflected only once each by the first and the second reflective surfaces 64 and 65, thereby allowing the real image 16 to be brighter while preventing the appearance of the mirror images of the object 11.

Furthermore, the object 11 is placed at one side of the light-shielding portion 69 (below the light-shielding portion 69 in FIG. 13(B)), and in the cylindrical space 70 having a central axis which is a perpendicular line passing through the point where the centerlines V of the respective light-controlling panels 68 intersect and being perpendicular to the light-shielding portion 69, and whose cross-section is the light-shielding portion 69. Such a configuration effectively intercept, among the light from the object 11, light directly passing through the light-reflecting elements 66 without being reflected by the first and the second reflective surfaces 64 and 65 of the light-reflecting elements 66, and light passing through the light-reflecting elements 66 after being reflected once by either one of the first and the second reflective surfaces 64 and 65. As a result, mirror images of the object 11 caused by transmitted light due to one-time reflection are substantially prevented from appearing and overlapping the real image 16.

While the present invention has been described as above referring to the preferred embodiments, the present invention is not limited to the configurations described in the embodiments, and various embodiments and modifications can be made without departing from the spirit and the scope of the claims of the present invention.

For example, in the first through the third embodiments, the ends of the first and the second reflective surfaces are adhered, however, a gap may be formed between the ends of the first reflective surfaces and the second reflective surfaces. Here, a width of the gap may be, e.g., less than 100 times the width of the first and the second reflective surfaces. Furthermore, in the first embodiment, the metallic reflection surface is formed on one side of the transparent synthetic resin plate, however, the metallic reflection surface may be formed on both sides of the transparent synthetic resin plate or the glass plate. Then, a number of transparent synthetic resin plates or glass plates, each provided with the metal reflection surfaces on the both sides thereof, are stacked to form a laminated body, from which the first and the second segment transparent plates may be cut out in a manner that cut planes will be perpendicular to the respective metallic reflection surfaces.

Furthermore, in the first and the second embodiments, the first and the second reflective surfaces have the same pitch, however, the first and the second reflective surfaces may have varied pitches.

In the first, the second, and the fifth embodiments, the segment light-controlling panels of the same size are arranged with no gap around the point where the centerlines of the segment light-controlling panels intersect so as to form the light-controlling panels in shapes of regular polygons either with N sides or with M sides. However, the segment light-controlling panels of the same size may be arranged with no gap therebetween in an angle range of 90° to 180° around the point where the centerlines of the segment light-controlling panels intersect, thereby forming a sector-shaped light-controlling panel.

Moreover, as long as the segment light-controlling panels are arranged with no gap therebetween such that the centerlines thereof intersect at one point, the segment light-controlling panels may have varied sizes.

Furthermore, in the real image of the object reproduced by the optical imaging apparatus according to the present invention, concavity and convexity are reversed. The concavity and convexity of the real image can be normalized by disposing two units of the optical imaging apparatuses of the present invention in the traveling direction of the light emitted from the object so that the concavity and convexity of the real image reproduced by the first optical imaging apparatus (disposed at the object side) can be inverted again by the second optical imaging apparatus.

EXPLANATION OF SYMBOLS

10: Optical imaging apparatus, 11: Object, 12: First reflective surface, 13: Second reflective surface, 14: Light-reflecting element, 15: Light-controlling panel, 16: Real image, 17: Segment light-controlling panel, 18: Light-shielding portion, 19: Cylindrical space, 20: First segment transparent plate, 21: Second segment transparent plate, 22: First panel, 23: Second panel, 24 & 25: Metallic reflection surfaces, 26: Composite panel, 27: Substrate panel, 28: Panel piece, 29: Optical imaging apparatus, 30: Segment light-controlling panel, 31: First reflective surface, 32: Second reflective surface, 33: First segment transparent plate, 34: Second segment transparent plate, 35: Light-reflecting element, 36 & 37: Grooves, 38 & 39: Light transmissive portions, 40 & 41: Inclined planes, 42: Optical imaging apparatus, 43: First reflective surface, 44: Second reflective surface, 45: Light-reflecting element, 46: Light-controlling panel, 47: Light-shielding portion, 48: Cylindrical space, 49: First light-controlling panel, 50: Second light-controlling panel, 51 & 52: Light-shielding area, 53 & 54: Hole, 55: Optical imaging apparatus, 56: First reflective surface, 57: Second reflective surface, 58: Light-reflecting element, 59: Light-controlling panel, 60: Light-shielding portion, 61: Cylindrical space, 62: Hole, 63: Optical imaging apparatus, 64: First reflective surface, 65: Second reflective surface, 66: Light-reflecting element, 67: Light-controlling panel, 68: Segment light-controlling panel, 69: Light-shielding portion, 70: Cylindrical space, 71: Raw panel, 72: Hole, 73 & 74: Metallic reflection surfaces, 75: Base panel, 76: Panel piece

The invention claimed is:

1. An optical imaging apparatus comprising a flat plate-shaped light-controlling panel for forming a real image of an object at a position plane-symmetric to the object with respect to the light-controlling panel as a central plane, the light-controlling panel having numerous light-reflecting elements disposed side by side, each of the light-reflecting elements allowing light from the object to pass therethrough by reflecting the light at a first reflective surface and further reflecting the light at a second reflective surface, the second reflective surface being disposed on a level different from that of the first reflective surface while being paired with the first reflective surface, and being in a crossed arrangement with respect to the first reflective surface when viewed from thereabove,
wherein the light-controlling panel is divided to comprise a plurality of segment light-controlling panels in which the first reflective surfaces and the second reflective surfaces included are parallel, respectively, and wherein centerlines of the respective segment light-controlling panels when viewed from thereabove intersect at one point on the light-controlling panel, and further wherein bisectors which bisect crossing angles between the first reflective surfaces and the second reflective surfaces of the light-reflecting elements existing on the centerlines coincide with the centerlines when viewed from thereabove.

2. The optical imaging apparatus according to claim 1, wherein the first and the second reflective surfaces comprised in the segment light-controlling panels are formed numerously inside a first segment transparent plate and a second segment transparent plate, respectively, the first and the second reflective surfaces being in strip shapes and arranged side by side at a constant pitch perpendicularly to one sides of the first and the second segment transparent plates, respectively, and wherein the numerous light-reflecting elements are formed by disposing one sides of the first and the second segment transparent plates face-to-face in a manner that the first and the second reflective surfaces are crossed.

3. An optical imaging apparatus comprising a flat plate-shaped light-controlling panel for forming a real image of an object at a position plane-symmetric to the object with respect to the light-controlling panel, the light-controlling panel having a number of light-reflecting elements disposed side by side, each of the light-reflecting elements allowing light from the object to pass therethrough by reflecting the light at a first reflective surface and further reflecting the light at a second reflective surface disposed in a crossed arrangement with respect to the first reflective surface, wherein the light-controlling panel is divided to comprise a plurality of segment light-controlling panels in which the first reflective surfaces and the second reflective surfaces included are parallel, respectively, and wherein centerlines of the respective segment light-controlling panels when viewed from thereabove intersect at one point on the light-controlling panel, and further wherein bisectors which bisect crossing angles between the first reflective surfaces and the second reflective surfaces of the light-reflecting elements existing on the centerlines when viewed from thereabove coincide with the centerlines.

4. The optical imaging apparatus according to claim 1, wherein a flat plate-shaped light-shielding portion where the light-reflecting element is absent is provided centering around the one point where the centerlines of the respective segment light-controlling panels intersect, and the object is placed in a cylindrical space having a central axis which is a perpendicular line passing through the one point and being perpendicular to the light-shielding portion, and also having a cross-sectional shape same as that of the light-shielding portion.

5. The optical imaging apparatus according to claim 1, wherein the respective segment light-controlling panels have a shape of an isosceles trapezoid when viewed from thereabove.

6. An optical imaging method using a light-controlling panel for forming a real image of an object at a position plane-symmetric to the object with respect to the light-controlling panel, the light-controlling panel having a number of light-reflecting elements disposed side by side, each of the light-reflecting elements allowing light from the object to pass therethrough by reflecting the light at a first reflective surface and further reflecting the light at a second reflective surface, the second reflective surface being disposed on a level different from that of the first reflective surface while being paired with the first reflective surface, and being in a crossed arrangement with respect to the first reflective surface when viewed from thereabove, comprising:

dividing the light-controlling panel into a plurality of segment light-controlling panels wherein the first and the second reflective surfaces included are parallel, respectively;

bringing centerlines of the respective segment light-controlling panels to intersect at one point on the light-controlling panel when viewed from thereabove; and bringing bisectors which bisect crossing angles between the first reflective surfaces and the second reflective surfaces of the light-reflecting elements existing on the centerlines, when viewed from thereabove, to coincide with the centerlines, thereby decreasing a ratio of the light-reflecting elements allowing light to pass therethrough by reflecting the light once by either one of the first and the second reflective surfaces with respect to the light-reflecting elements allowing light to pass therethrough by reflecting the light once each by the first and the second reflective surfaces in the respective segment light-controlling panels.

7. An optical imaging method using a flat plate-shaped light-controlling panel for forming a real image of an object at a position plane-symmetric to the object with respect to the light-controlling panel, the light-controlling panel having a number of light-reflecting elements disposed side by side, each of the light-reflecting elements allowing light from the object to pass therethrough by reflecting the light at a first reflective surface and further reflecting the light at a second reflective surface disposed in a crossed arrangement with respect to the first reflective surface, comprising:

dividing the light-controlling panel into a plurality of segment light-controlling panels wherein the first reflective surfaces and the second reflective surfaces included are parallel, respectively;

bringing centerlines of the respective segment light-controlling panels to intersect at one point on the light-controlling panel when viewed from thereabove; and bringing bisectors which bisect crossing angles between the first reflective surfaces and the second reflective surfaces of the light-reflecting elements existing on the centerlines, when viewed from thereabove, to coincide with the centerlines, thereby decreasing a ratio of the light-reflecting elements allowing light to pass therethrough by reflecting the light once by either one of the first and the second reflective surfaces with respect to the light-reflecting elements allowing light to pass therethrough by reflecting the light once each by the first and the second reflective surfaces in the respective segment light-controlling panels.

8. The optical imaging method according to claim 6, further comprising:

forming a flat plate-shaped light-shielding portion, where the light-reflecting element is absent, centering around the one point where the centerlines of the respective segment light-controlling panels intersect; and placing the object in a cylindrical space and at one side of the light-shielding portion, the cylindrical space having a central axis which is a perpendicular line passing through the one point and being perpendicular to the light-shielding portion, and whose cross-section is the light-shielding portion.

9. The optical imaging method according to claim 6, further comprising:

forming the respective segment light-controlling panels to have a shape of an isosceles trapezoid when viewed from thereabove.

10. The optical imaging apparatus according to claim 2, wherein a flat plate-shaped light-shielding portion where the light-reflecting element is absent is provided centering around the one point where the centerlines of the respective segment light-controlling panels intersect, and the object is placed in a cylindrical space having a central axis which is a perpendicular line passing through the one point and being perpendicular to the light-shielding portion, and also having a cross-sectional shape same as that of the light-shielding portion.

11. The optical imaging apparatus according to claim 3, wherein a flat plate-shaped light-shielding portion where the light-reflecting element is absent is provided centering around the one point where the centerlines of the respective segment light-controlling panels intersect, and the object is placed in a cylindrical space having a central axis which is a perpendicular line passing through the one point and being perpendicular to the light-shielding portion, and also having a cross-sectional shape same as that of the light-shielding portion.

12. The optical imaging apparatus according to claim 2, wherein the respective segment light-controlling panels have a shape of an isosceles trapezoid when viewed from thereabove.

13. The optical imaging apparatus according to claim 3, wherein the respective segment light-controlling panels have a shape of an isosceles trapezoid when viewed from thereabove.

14. The optical imaging apparatus according to claim 4, wherein the respective segment light-controlling panels have a shape of an isosceles trapezoid when viewed from thereabove.

15. The optical imaging method according to claim 7, further comprising:
   forming a flat plate-shaped light-shielding portion, where the light-reflecting element is absent, centering around the one point where the centerlines of the respective segment light-controlling panels intersect; and
   placing the object in a cylindrical space and at one side of the light-shielding portion, the cylindrical space having a central axis which is a perpendicular line passing through the one point and being perpendicular to the light-shielding portion, and whose cross-section is the light-shielding portion.

16. The optical imaging method according to claim 7, further comprising:
   forming the respective segment light-controlling panels to have a shape of an isosceles trapezoid when viewed from thereabove.

17. The optical imaging method according to claim 8, further comprising:
   forming the respective segment light-controlling panels to have a shape of an isosceles trapezoid when viewed from thereabove.

* * * * *